(12) United States Patent
El Essaili et al.

(10) Patent No.: US 12,143,906 B2
(45) Date of Patent: Nov. 12, 2024

(54) NETWORK NODE, VEHICLE TO EVERYTHING APPLICATION ENABLER CLIENT AND METHODS PERFORMED THEREIN

(71) Applicant: Telefonaktiebolaget LM Ericsson (publ), Stockholm (SE)

(72) Inventors: Ali El Essaili, Aachen (DE); Yunpeng Zang, Wuerselen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 367 days.

(21) Appl. No.: 17/595,302

(22) PCT Filed: Dec. 23, 2019

(86) PCT No.: PCT/SE2019/051339
§ 371 (c)(1),
(2) Date: Nov. 12, 2021

(87) PCT Pub. No.: WO2020/231309
PCT Pub. Date: Nov. 19, 2020

(65) Prior Publication Data
US 2022/0201443 A1      Jun. 23, 2022

Related U.S. Application Data

(60) Provisional application No. 62/846,773, filed on May 13, 2019.

(51) Int. Cl.
*H04W 4/40* (2018.01)
*H04W 60/00* (2009.01)

(52) U.S. Cl.
CPC ............. *H04W 4/40* (2018.02); *H04W 60/00* (2013.01)

(58) Field of Classification Search
None
See application file for complete search history.

(56) References Cited

U.S. PATENT DOCUMENTS

| 9,414,347 B2 | 8/2016 | Rembarz et al. |
| 2014/0050142 A1 | 2/2014 | Song et al. |

(Continued)

FOREIGN PATENT DOCUMENTS

| CN | 102833687 A | 12/2012 |
| CN | 107295460 A | 10/2017 |

(Continued)

OTHER PUBLICATIONS

Examination Report, IN App. No. 202147056979, Jun. 13, 2023, 6 pages.

(Continued)

*Primary Examiner* — Frantz Bataille
(74) *Attorney, Agent, or Firm* — Nicholson De Vos Webster & Elliott LLP

(57) ABSTRACT

A method performed by a vehicle to everything application enabler (VAE) client of a wireless device for using a service in a wireless communication network for vehicle to anything (V2X) wireless devices. The VAE client receives, from a V2X application specific client, a V2X message of a service with a service ID; and determines a network node for receiving an uplink V2X message based on the service ID. The VAE client further transmits the uplink V2X message to the determined network node with the service ID.

16 Claims, 15 Drawing Sheets

(56) References Cited

U.S. PATENT DOCUMENTS

| | | | |
|---|---|---|---|
| 2015/0189615 | A1 | 7/2015 | Rembarz et al. |
| 2016/0285935 | A1 | 9/2016 | Wu et al. |
| 2017/0295531 | A1 | 10/2017 | Singh et al. |
| 2018/0124656 | A1* | 5/2018 | Park .................... H04W 36/36 |
| 2018/0159935 | A1 | 6/2018 | Cavalcanti et al. |
| 2018/0167790 | A1 | 6/2018 | Cavalcanti et al. |
| 2018/0310241 | A1 | 10/2018 | Yu et al. |
| 2019/0037448 | A1 | 1/2019 | Shan et al. |
| 2019/0124489 | A1 | 4/2019 | Ahmad et al. |
| 2019/0313359 | A1* | 10/2019 | Lee .................... H04W 76/14 |

FOREIGN PATENT DOCUMENTS

| | | |
|---|---|---|
| CN | 107710795 A | 2/2018 |
| KR | 10-2015-0072809 A | 6/2015 |
| KR | 10-2017-0130428 A | 11/2017 |
| KR | 10-2017-0139665 A | 12/2017 |
| WO | 2016/209314 A1 | 12/2016 |
| WO | 2017/052690 A1 | 3/2017 |
| WO | 2018202798 A1 | 11/2018 |
| WO | 2019/006085 A1 | 1/2019 |
| WO | 2020231308 A1 | 11/2020 |

OTHER PUBLICATIONS

Office Action with Search Report, CN App. No. 201980096353.7, Nov. 1, 2023, 10 pages of Original Document only.
Office Action with Search Report, CN App. No. 201980096354.1, Oct. 21, 2023, 10 pages of Original Document only.
Office Action, JP App. No. 2021-567793, Dec. 20, 2022, 17 pages (5 pages of English Translation and 12 pages of Original Document).
TSG SA WG6, "Presentation of TR 23.795 v2.0.0 for approval: Study on application layer support for V2X services", 3GPP TSG-SA Meeting #81, SP-180682, Sep. 12-14, 2018, 10 pages, Gold Coast, Australia.
International Search Report and Written Opinion for Application No. PCT/SE2019/051338, dated Mar. 20, 2020, 11 pages.
International Search Report and Written Opinion for Application No. PCT/SE2019/051339, dated Mar. 9, 2020, 11 pages.
International Preliminary Report on Patentability for Application No. PCT/SE2019/051338, dated May 18, 2021, 51 pages.
International Preliminary Report on Patentability for Application No. PCT/SE2019/051339, dated Apr. 30, 2021, 11 pages.
3GPP TR 21.905 V15.1.0, "3rd Generation Partnership Project; Technical Specification Group Services and System Aspects; Vocabulary for 3GPP Specifications (Release 15)," Dec. 2018, 65 pages, 3GPP Organizational Partners.
3GPP TR 23.795 V16.1.0, "3rd Generation Partnership Project; Technical Specification Group Services and System Aspects; Study on application layer support for V2X services; (Release 16)," Dec. 2018, 77 pages, 3GPP Organizational Partners.
3GPP TS 22.185 V15.0.0, "3rd Generation Partnership Project; Technical Specification Group Services and System Aspects; Service requirements for V2X services; Stage 1 (Release 15)," Jun. 2018, 14 pages, 3GPP Organizational Partners.
3GPP TS 22.186 V16.1.0, "3rd Generation Partnership Project; Technical Specification Group Services and System Aspects; Enhancement of 3GPP support for V2X scenarios; Stage 1 (Release 16)," Dec. 2018, 18 pages, 3GPP Organizational Partners.
3GPP TS 23.280 V16.2.0, "3rd Generation Partnership Project; Technical Specification Group Services and System Aspects; Common functional architecture to support mission critical services; Stage 2 (Release 16)," Mar. 2019, 210 pages, 3GPP Organizational Partners.
3GPP TS 23.285 V16.0.0, "3rd Generation Partnership Project; Technical Specification Group Services and System Aspects; Architecture enhancements for V2X services (Release 16)," Mar. 2019, 37 pages, 3GPP Organizational Partners.
3GPP TS 23.286 V1.1.0, "3rd Generation Partnership Project; Technical Specification Group Services and System Aspects; Application layer support for V2X services; Functional architecture and information flows; (Release 16)," Apr. 2019, 55 pages, 3GPP Organizational Partners.
3GPP TS 23.434 V1.1.0, "3rd Generation Partnership Project; Technical Specification Group Services and System Aspects; Service Enabler Architecture Layer for Verticals; Functional architecture and information flows; (Release 16)," Apr. 2019, 89 pages, 3GPP Organizational Partners.
3GPP TS 23.468 V15.0.0, "3rd Generation Partnership Project; Technical Specification Group Services and System Aspects; Group Communication System Enablers for LTE (GCSE_Lte); Stage 2 (Release 15)," Dec. 2017, 32 pages, 3GPP Organizational Partners.
3GPP TS 23.682 V16.2.0, "3rd Generation Partnership Project; Technical Specification Group Services and System Aspects; Architecture enhancements to facilitate communications with packet data networks and applications (Release 16)," Mar. 2019, 126 pages, 3GPP Organizational Partners.
3GPP TS 24.386 V15.2.0, "3rd Generation Partnership Project; Technical Specification Group Core Network and Terminals; User Equipment (UE) to V2X control function; protocol aspects; Stage 3 (Release 15)," Dec. 2018, 35 pages, 3GPP Organizational Partners.
3GPP TS 26.346 V16.1.0, "3rd Generation Partnership Project; Technical Specification Group Services and System Aspects; Multimedia Broadcast/Multicast Service (MBMS); Protocols and codecs (Release 16)," Mar. 2019, 257 pages, 3GPP Organizational Partners.
3GPP TS 26.348 V16.1.0, "3rd Generation Partnership Project; Technical Specification Group Services and System Aspects; Northbound Application Programming Interface (API) for Multimedia Broadcast/Multicast Service (MBMS) at the xMB reference point (Release 16)," Mar. 2019, 45 pages, 3GPP Organizational Partners.
3GPP TS 29.214 V15.6.0, "3rd Generation Partnership Project; Technical Specification Group Core Network and Terminals; Policy and Charging Control over Rx reference point (Release 15)," Mar. 2019, 89 pages, 3GPP Organizational Partners.
3GPP TS 29.468 V15.5.0, "3rd Generation Partnership Project; Technical Specification Group Core Network and Terminals; Group Communication System Enablers for LTE (GCSE_Lte); MB2 Reference Point; Stage 3 (Release 15)," Mar. 2019, 43 pages, 3GPP Organizational Partners.
3GPP TS 36.300 V15.5.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)," Mar. 2019, 363 pages, 3GPP Organizational Partners.
ETSI EN 302 637-3 V1.3.1, "Intelligent Transport Systems (ITS); Vehicular Communications; Basic Set of Applications; Part 3: Specifications of Decentralized Environmental Notification Basic Service," Apr. 2019, 74 pages, ETSI.
ETSI TS 102 894-2 V1.2.1, "Intelligent Transport Systems (ITS); Users and applications requirements; Part 2: Applications and facilities layer common data dictionary," Sep. 2014, 94 pages, European Telecommunications Standards Institute.
ETSI 102 965 V1.4.1, "Intelligent Transport Systems (ITS); Application Object Identifier (ITS-AID); Registration," Nov. 2018, 8 pages, ETSI.
Communication pursuant to Article 94(3) EPC, EP Application No. 19829706.1, May 4, 2022, 6 pages.
Communication under Rule 71(3) EPC, EP Application No. 19829706.1, Mar. 28, 2023, 8 pages.
Communication under Rule 71(3) EPC, EP Application No. 19829707.9, May 25, 2022, 7 pages.
Decision of Rejection, JP App. No. 2021-567793, Apr. 25, 2023, 11 pages (4 pages of English Translation and 7 pages of Original Document).
Decision of grant, EP Application No. 19829707.9, Sep. 29, 2022, 2 pages.
Office Action, CA App. No. 3140380, Dec. 28, 2022, 3 pages.
Written Opinion of the International Preliminary Examining Authority for Application No. PCT/SE2019/051338, dated Mar. 17, 2021, 6 pages.

(56) References Cited

OTHER PUBLICATIONS

Written Opinion of the International Preliminary Examining Authority for Application No. PCT/SE2019/051339, dated Mar. 24, 2021, 7 pages.
ISO TS 17419: "Intelligent Transport Systems—Cooperative—Classification and management of ITS applications in a global context," Apr. 15, 2014, 48 pages, Technical Specifications, ISO.

* cited by examiner

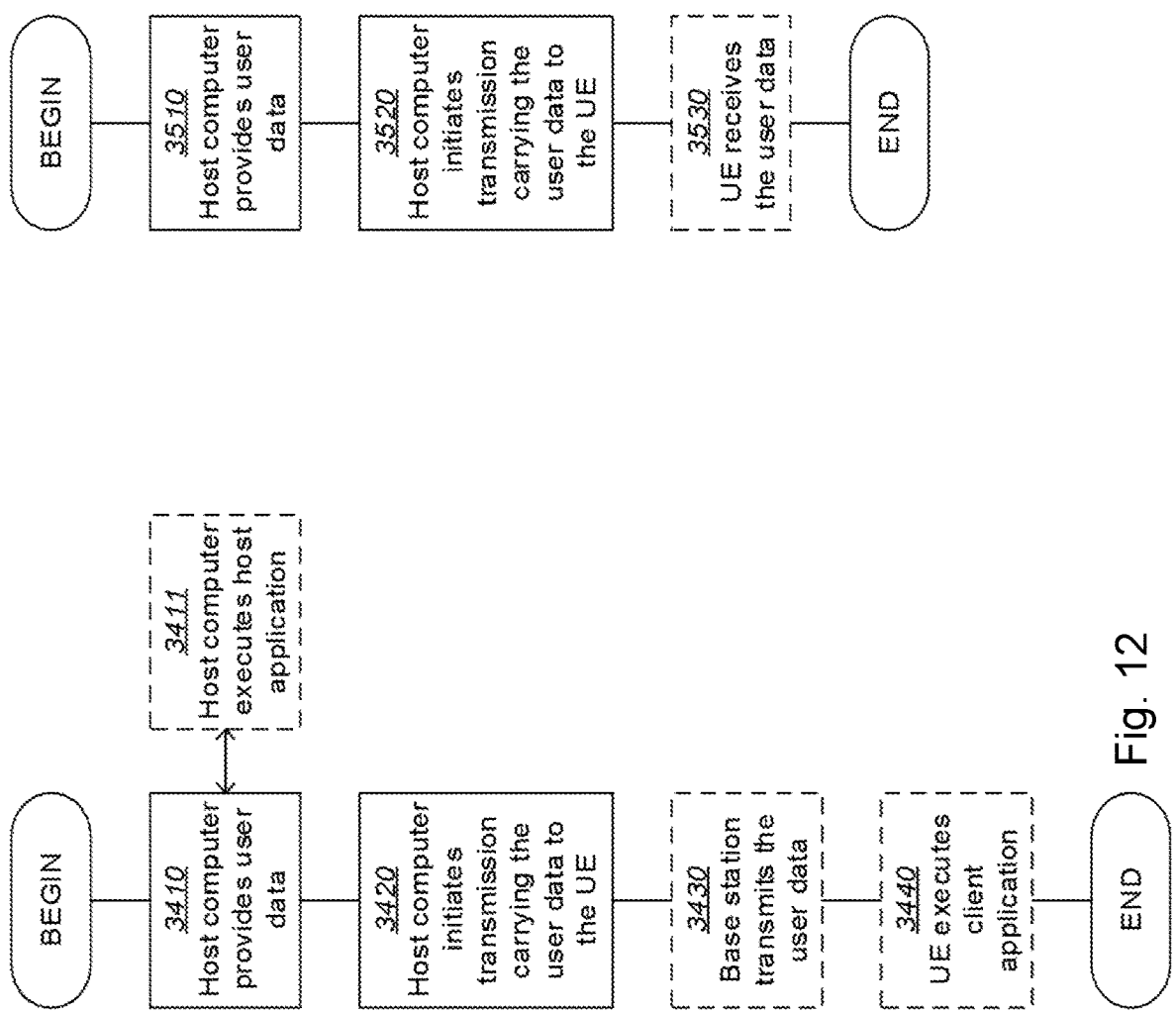

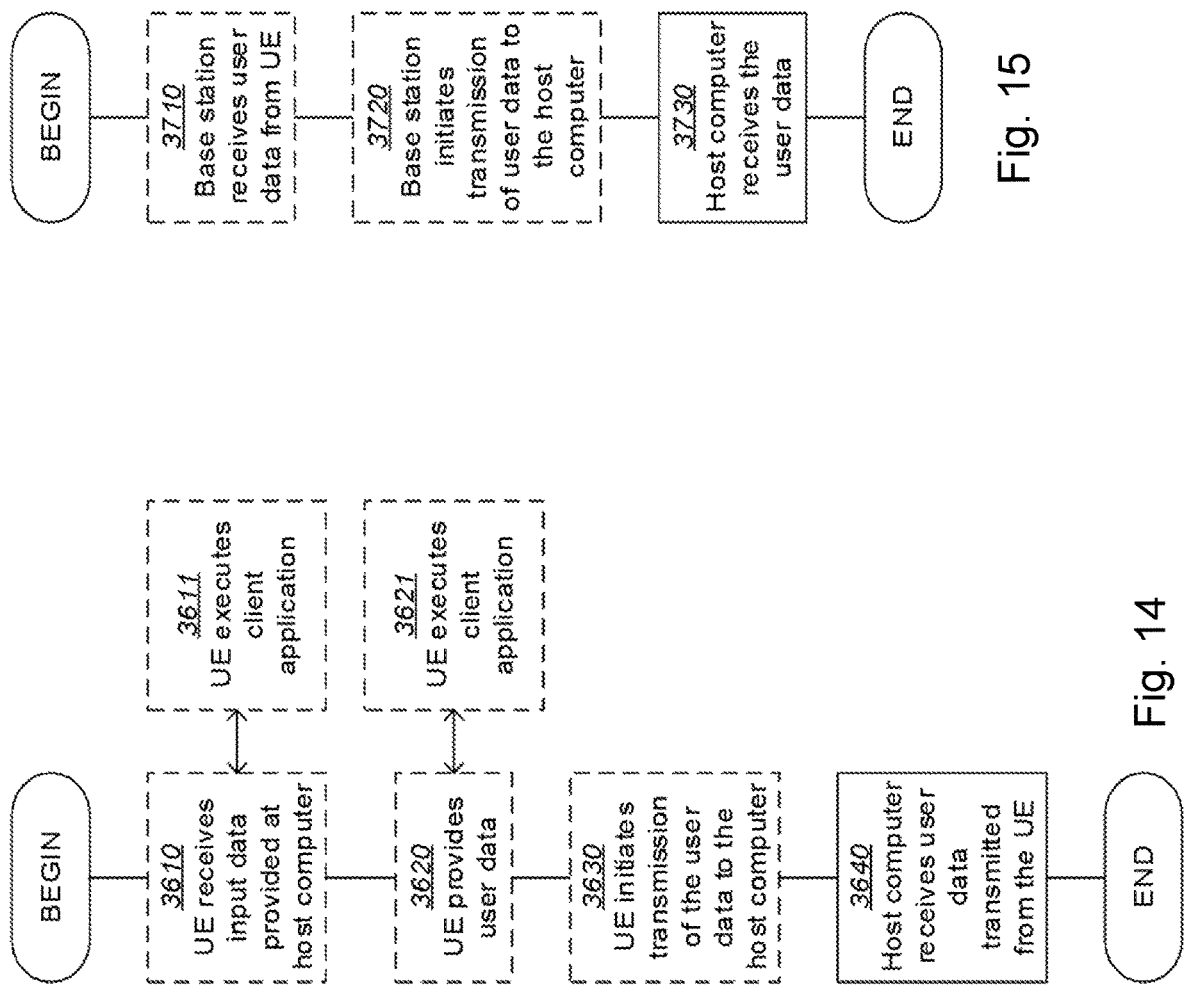

NETWORK NODE, VEHICLE TO EVERYTHING APPLICATION ENABLER CLIENT AND METHODS PERFORMED THEREIN

CROSS-REFERENCE TO RELATED APPLICATIONS

This application is a National stage of International Application No. PCT/SE2019/051339, filed Dec. 23, 2019, which claims priority to U.S. Application No. 62/846,773, filed May 13, 2019, which are hereby incorporated by reference.

TECHNICAL FIELD

Embodiments herein relate to a network node, a vehicle to everything application enabler (VAE) client of a wireless device and methods performed therein. Furthermore, a computer program product and a computer readable storage medium are also provided herein. In particular, embodiments herein relate to enable communication of vehicle to everything (V2X) wireless devices in a wireless communication network.

BACKGROUND

In a typical wireless communication network, wireless devices, also known as wireless communication devices, mobile stations, stations (STA), vehicles, and/or user equipments (UE), communicate via a Radio Access Network (RAN) to one or more core networks (CN). The RAN covers a geographical area and provides radio coverage over service areas or cells, which may also be referred to as a beam or a beam group, with each service area or beam being served or controlled by a radio network node such as a radio access node e.g., a Wi-Fi access point or a radio base station (RBS), which in some networks may also be denoted, for example, a NodeB, an eNodeB, or a gNodeB. The radio network node communicates over an air interface operating on radio frequencies with the wireless device within range of the radio network node.

A Universal Mobile Telecommunications network (UMTS) is a third generation (3G) telecommunications network, which is evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipments. In a forum known as the Third Generation Partnership Project (3GPP), telecommunications suppliers propose and agree upon standards for third generation networks, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. This type of connection is sometimes referred to as a backhaul connection. The RNCs and BSCs are typically connected to one or more core networks.

Specifications for the Evolved Packet System (EPS), also called a Fourth Generation (4G) network, have been completed within the 3$^{rd}$ Generation Partnership Project (3GPP) and this work continues in the coming 3GPP releases, for example to specify a Fifth Generation (5G) network. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs. In general, in E-UTRAN/LTE the functions of an RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted as the X2 interface.

For the 5G system currently being standardized by 3GPP, where the radio access network is referred to as New Radio (NR) and the core network is referred to as Next Generation Core (NGC), 3GPP has agreed to partly change the principles for distribution of system information (SI) that are used in LTE.

During Release 12, the LTE standard has been extended with support of device to device (D2D), specified as "sidelink", features targeting both commercial and Public Safety applications. Some applications enabled by Rel-12 LTE are device discovery, where wireless devices are able to sense the proximity of another wireless device and associated application by broadcasting and detecting discovery messages that carry wireless device and application identities. Another application consists of direct communication based on physical channels terminated directly between wireless devices. In 3GPP, all of these applications are defined under the umbrella denoted as Proximity Services (ProSe).

One of the potential extensions of the ProSe framework consists of support of Vehicle to everything (V2X) communication, which includes any combination of direct communication between vehicles, pedestrians, and infrastructure. V2X communication may take advantage of a Network (NW) infrastructure, when available, but at least basic V2X connectivity should be possible even in case of lack of coverage. Providing an LTE-based V2X interface may be economically advantageous because of the LTE economies of scale and it may enable tighter integration between communications with the NW infrastructure e.g. Vehicle to Infrastructure (V2I) and Vehicle to Pedestrians (V2P) and Vehicle to Vehicle (V2V) communications, as compared to using a dedicated V2X technology.

There are many research projects and field tests of connected vehicles in various countries or regions, including projects that are based on the use of existing cellular infrastructure.

V2X communications may carry both non-safety and safety information, where each of the applications and services may be associated with specific requirements, in terms of e.g. latency, reliability, capacity, etc. From an application point of view, V2X includes the following types of communication/services shown in reference to FIG. 1.

Vehicle to vehicle (V2V): This covers communication between vehicles using V2V applications and is predominantly broadcast-based. V2V may be realized by either direct communication between the devices in the respective vehicles, or via infrastructure such as a cellular network. An example of V2V is the transmission of a cooperative awareness message (CAM) with vehicle status information, such as position, direction, and speed, transmitted to other vehicles in the proximity repeatedly e.g. every 100 ms-1 s. Another example is the transmission of a decentralized environmental notification message (DENM), which is an event-triggered message to alert vehicles. These two examples are taken from the ETSI Intelligent Transport Systems (ITS) specification of V2X applications, which also specifies the conditions under which the messages are generated. Main characteristic of V2V applications is the tight requirements on latency that can vary from 20 ms (for pre-crash warning messages) to 100 ms for other road safety services.

Vehicle to infrastructure (V2I): This comprises communication between vehicles and a Roadside Unit (RSU). The RSU may be a stationary transportation infrastructure entity which communicates with vehicles in its proximity. An example of V2I is transmission of speed notifications from the RSU to vehicles, as well as queue information, collision risk alerts, curve speed warnings. Due to the safety related nature of V2I, delay requirements are similar to V2V requirements.

Vehicle to pedestrian (V2P): This covers communication between vehicles and vulnerable road users, such as pedestrians, using V2P applications. V2P typically takes place between distinct vehicles and pedestrians either directly or via infrastructure such as a cellular network.

Vehicle to network (V2N): This covers communication between a vehicle and a centralized application server (or an Intelligent transportation systems (ITS) Traffic Management Center) both using V2N applications, via infrastructure (such as a cellular network). One example is a bad road condition warning sent to all vehicles in a wide area, or traffic flow optimization in which V2N application suggests speeds to vehicles and coordinates traffic lights. Therefore, V2N messages are supposed to be controlled by a centralized entity, such as a Traffic Management Center, and may be provisioned to vehicles in a large geographical area, rather than in a small area. Additionally, unlike V2V/V2I, latency requirements are more relaxed in V2N because it is not meant to be used for non-safety purposes, e.g. a latency requirement of 1 s is typically considered.

As previously mentioned Sidelink transmissions (also known as D2D or ProSe) over the so-called PC5 interface in cellular spectrum have been standardized in 3GPP since Rel-12. In 3GPP Rel-12 two different transmission modes have been specified in 3GPP. In one mode (mode-1), a UE in RRC_CONNECTED mode requests D2D resources and the eNB grants them via physical downlink control channel (PDCCH) also denoted as DCI5, or via dedicated signalling. In another mode (mode-2), a UE autonomously selects resources for transmission from a pool of available resources that the eNB provides in broadcast via system information block (SIB) signalling for transmissions on carriers other than a primary cell (PCell) or via dedicated signaling for transmission on the PCell. Therefore, unlike the first operation mode, the second operation mode can be performed also by UEs in RRC_IDLE and in some cases even by UEs out of coverage.

In Rel.14, the usage of sidelink is extended to the V2X domain. The original design of the sidelink physical layer in Rel.12 targeted a scenario with a small number of wireless devices such as UEs competing for the same physical resources in the spectrum, to carry voice packet for Mission Critical Push To Talk (MCPTT) traffic, and assumed low wireless device mobility. On the other hand, in V2X the sidelink should be able to cope with higher load scenario, i.e., hundreds of cars potentially contending for physical resources, to carry time/event triggered V2X messages e.g. Cooperative Awareness Message (CAM) and Decentralized Environmental Notification Message (DENM), and with high wireless device mobility. For such reasons, 3GPP has discussed possible enhancements to the sidelink physical layer.

This disclosure deals with Intelligent transportation system (ITS) and V2X communication from V2X application server and V2X application client to wireless devices referred to as V2X wireless devices using V2X group communication over long-range cellular unicast communication, over interface LTE Uu.

ITS messages are designed to enable ITS applications improving safety and traffic efficiency of road transport systems. In several V2X applications, e.g. tele-operation, fleet management, group communication is needed for V2X communication from the V2X application server to V2X wireless devices. The group management services shall provide V2X Application Enabler (VAE) support for communication from a V2X wireless device or a V2X application server to a group of V2X wireless devices, to support V2X services, e.g. platooning groups, tele-operation of automated vehicles.

3GPP TS 23.386 [1] defines V2X application layer model for V2X communications over PC5 and LTE-Uu. The model is illustrated in FIG. 2. The V2X application enabler (VAE) layer provide support information to the V2X application.

A V2X UE1 communicates with a V2X application server over a V1 reference point. The V2X UE1 and V2X UE2 communicate over a V5 reference point. The V2X UE1 can also act as a UE-to-network relay, to enable the V2X UE2 to access the V2X application server over the V1 reference point.

The V2X application layer functional entities for the V2X wireless device and the V2X application server are grouped into the V2X application specific layer and the VAE layer. The VAE layer offers the VAE capabilities to the V2X application specific layer. The V2X application layer functional model utilizes the SEAL services as specified in 3GPP TS 23.434 [2].

The VAE server is located in the VAE layer. The SEAL services utilized by VAE layer are location management, group management, configuration management, identity management, key management and network resource management. The V2X application specific layer consists of the V2X application specific functionalities.

The V2X application server comprises the VAE server, the SEAL servers and the V2X application specific server. The VAE server provides the V2X application layer support functions to the V2X application specific server over Vs reference point.

The V2X UEs comprise the VAE client, the SEAL clients and the V2X application specific client. The VAE client provides the V2X application layer support functions to the V2X application specific client over Vc reference point.

In some deployments, the client and server entities of SEAL can be part of VAE client and VAE server respectively.

The VAE client acts as a VAL client for its interaction with the SEAL clients as specified in 3GPP TS 23.434 [2]. The VAE server may act as a vertical application layer (VAL) server for its interaction with the Service Enabler Architecture Layer for Verticals (SEAL) servers as specified in 3GPP TS 23.434 [2].

In the VAE layer, the VAE client communicates with the VAE server over V1-AE reference point. In the V2X application specific layer, the V2X application specific client communicates with V2X application specific server over V1-APP reference point.

In the VAE layer, the VAE client of the V2X UE2 communicates with the VAE client of the V2X UE1 over V5-AE reference point. In the V2X application specific layer, the V2X application specific client of V2X UE2 communicates with VAE client of V2X UE1 over V5-APP reference point.

The following SEAL services for V2X applications are supported:
  Location management as specified in 3GPP TS 23.434 [2];
  Group management as specified in 3GPP TS 23.434 [2];
  Configuration management as specified in 3GPP TS 23.434 [2];
  Identity management as specified in 3GPP TS 23.434 [2];
  Key management as specified in 3GPP TS 23.434 [2]; and
  Network resource management as specified in 3GPP TS 23.434 [2].

The VAE client interacts with SEAL clients over the SEAL-C reference point specified for each SEAL service. The VAE server interacts with SEAL servers over the SEAL-S reference point specified for each SEAL service. The interaction between the SEAL clients is supported by SEAL-PC5 reference point specified for each SEAL service. The interaction between a SEAL client and the corresponding SEAL server is supported by SEAL-UU reference point specified for each SEAL service.

The SEAL-C, SEAL-S, SEAL-PC5, SEAL-Uu reference points for each SEAL service are specified in 3GPP TS 23.434 [2].

To support distributed VAE server deployments, the VAE server interacts with another VAE server over VAE-E reference point.

V2X UE1 can also act as a UE-to-network relay,
  to enable VAE client on V2X UE2 to access VAE server over V1-AE reference point; and
  to enable V2X application specific client on V2X UE2 to access V2X application specific server over V1-APP reference point.

A V1-AE message can be sent over unicast, transparent multicast via xMB, transparent multicast via MB2. The non-transparent multicast via xMB is triggered by a V1-AE message. Multicast distribution can be supported by both transparent and non-transparent multicast modes.

The VAE server interacts with the 3GPP network system over V2, MB2, xMB, Rx and T8 reference points. The EPS is considered as the 3GPP network system.

SUMMARY

The current technical specification [1] only includes downlink V2X distribution procedures. The uplink V2X delivery information flows and procedures are not specified.

An object of embodiments herein is to provide a mechanism that improves performance of a wireless communication network, regarding vehicle to everything communication, in an efficient manner.

According to an aspect the object is achieved by providing a method performed by a network node for managing or handling communication of V2X wireless devices in a wireless communication network. The network node receives from a VAE client of a wireless device an uplink V2x message with a service ID. The network node then handles the UL V2X message taking the service ID into account.

According to another aspect the object is achieved by providing a method performed by a VAE client of a wireless device for using a service in a wireless communication network for V2X wireless devices. The VAE client receives, from a V2X application specific client, a V2X message of a service with a service ID. The VAE client determines a network node for receiving an uplink V2X message based on the service ID, and transmits the uplink V2X message to the determined network node with the service ID. E.g. it herein disclosed a wireless device for communicating, handling or using a service in a wireless communication network. The wireless device determines a network node for receiving an uplink message such as a V2x message based on a service ID. The wireless device then transmits the uplink message to the determined network node with the service ID.

According to yet another aspect the object is achieved by providing a VAE client of a wireless device for using a service in a wireless communication network for V2X wireless devices. The VAE client is configured to receive, from a V2X application specific client, a V2X message of a service with a service ID. The VAE client further determines a network node for receiving an uplink V2X message based on the service ID; and transmits the uplink V2X message to the determined network node with the service ID.

According to yet another aspect the object is achieved by providing a network node for handling communication of V2X wireless devices in a wireless communication network. The network node is configured to receive from a VAE client of a wireless device, an uplink V2X message with a service ID; and to handle the uplink V2X message taking the service ID into account.

It is furthermore provided herein a computer program product comprising instructions, which, when executed on at least one processor, cause the at least one processor to carry out any of the methods above, as performed by the VAE client or the network node, respectively. It is additionally provided herein a computer-readable storage medium, having stored thereon a computer program product comprising instructions which, when executed on at least one processor, cause the at least one processor to carry out the method according to any of the methods above, as performed by the VAE client or the network node, respectively.

Embodiments herein describe the procedures and information flows for uplink V2X message delivery from a V2X UE to a network node and V2X application server over e.g. radio interface LTE Uu. Furthermore, the procedures and information flows for V2X UE to V2X UE via LTE Uu are also defined. Furthermore, optimizations for uplink V2X message delivery are provided herein.

Embodiments herein enable VAE clients of wireless devices, such as V2X UEs, to deliver uplink V2X messages to the network node such as a server, an V2X AS and other wireless devices and specifies the protocol and message fields. This will lead to an improved performance of the wireless communication network.

BRIEF DESCRIPTION OF THE DRAWINGS

Embodiments will now be described in more detail in relation to the enclosed drawings, in which.

FIGS. 12-15 are flowcharts illustrating methods implemented in a communication system including a host computer, a base station and a user equipment.

DETAILED DESCRIPTION

Figure 1:
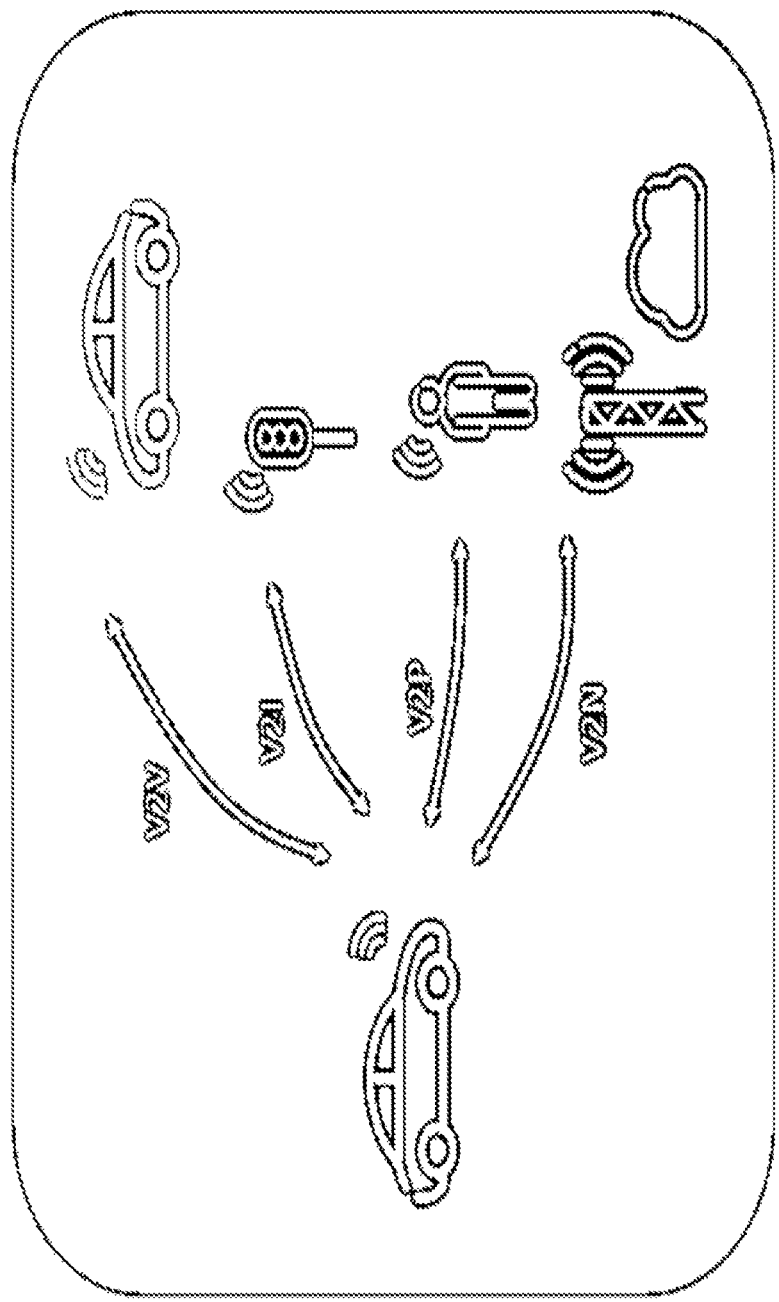
FIG. 1 is a schematic logical overview depicting vehicle communications.
Figure 2:
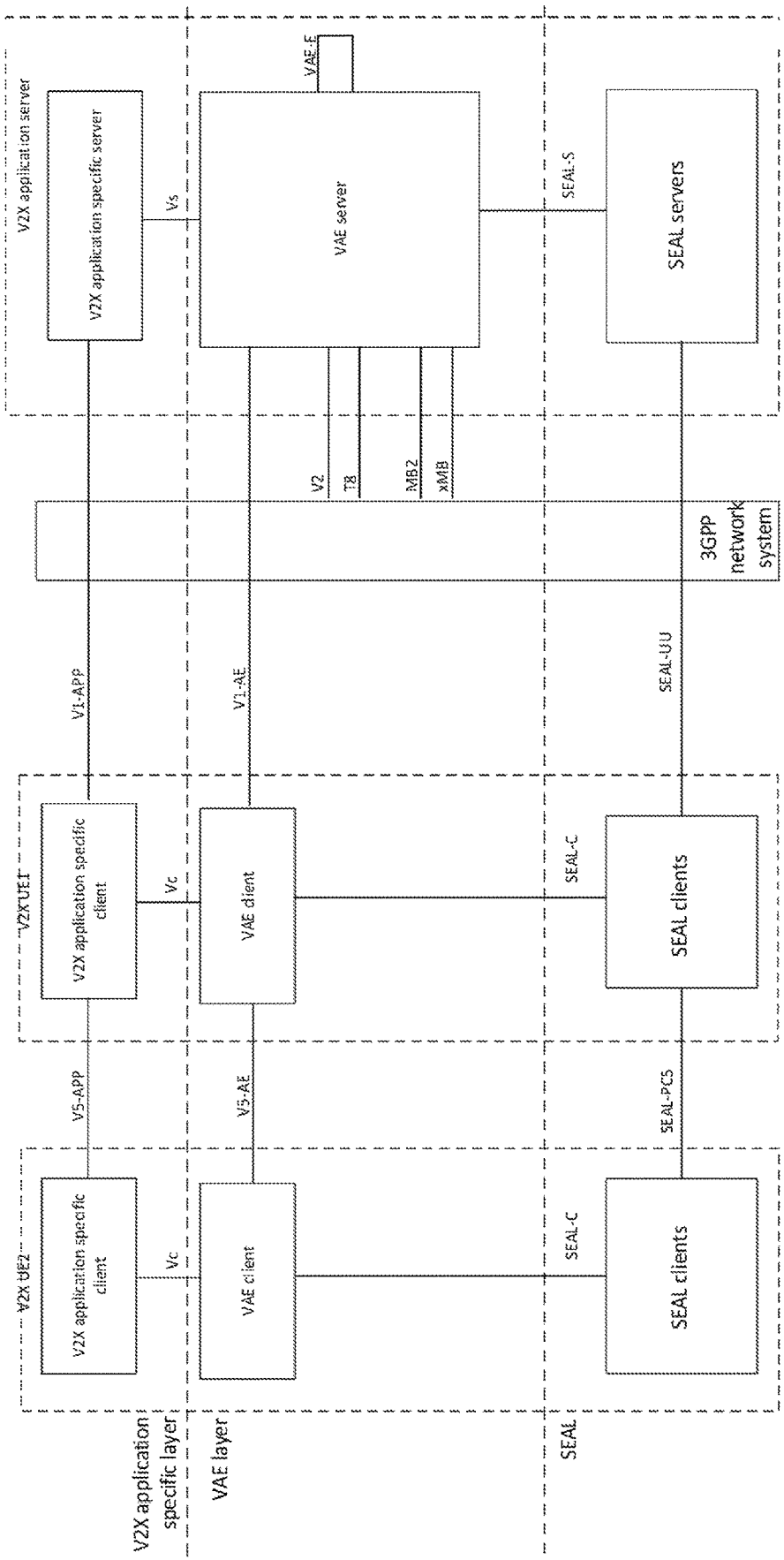
FIG. 2 is a schematic block diagram depicting vehicle communications.
Figure 3:
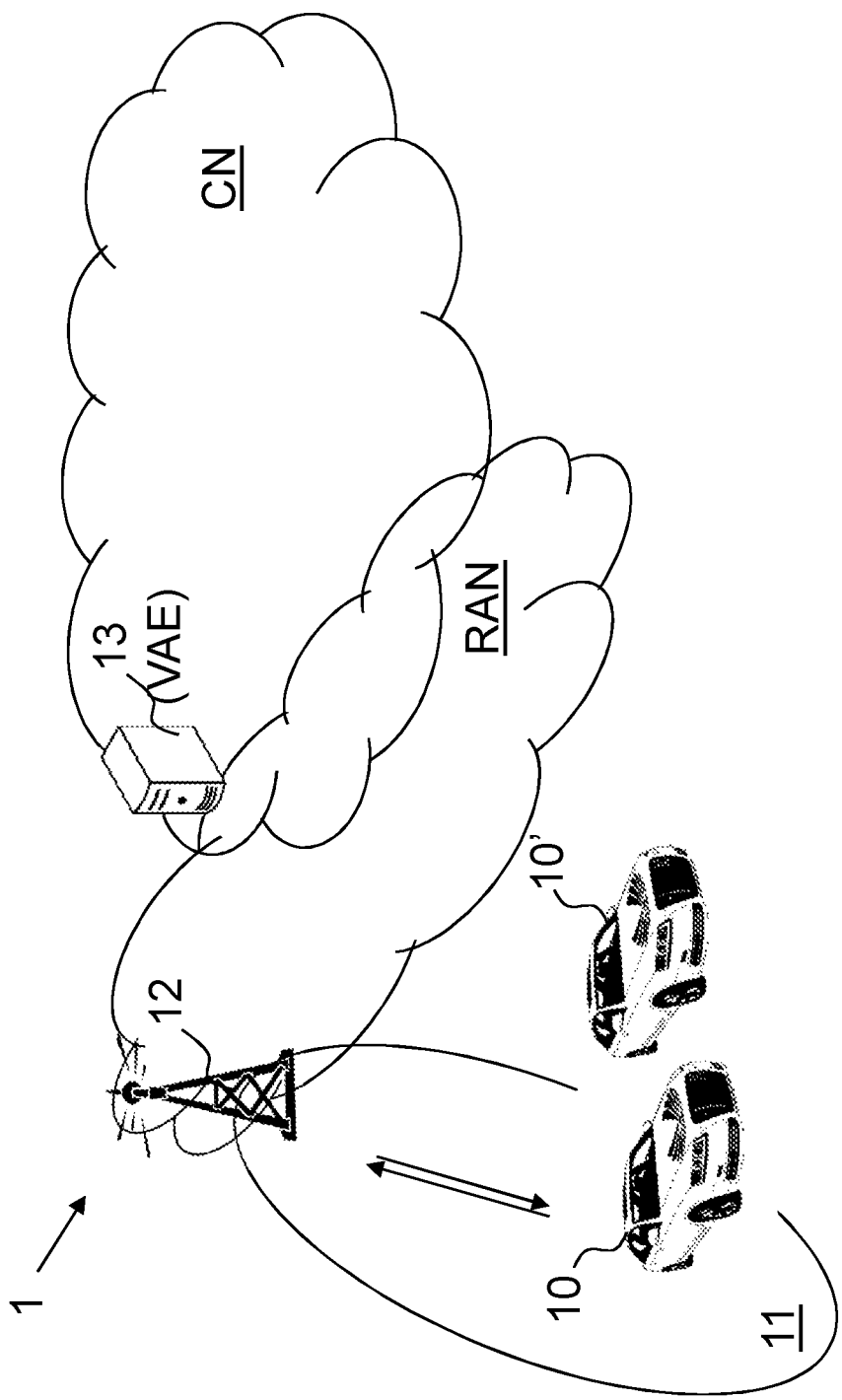
FIG. 3 is a schematic diagram depicting a wireless communication network according to embodiments herein.

Embodiments herein relate to wireless communication networks in general. FIG. 3 is a schematic overview depicting a wireless communication network 1. The wireless communication network 1 comprises one or more RANs and one or more core networks (CNs). The wireless communication network 1 may use one or a number of different technologies, such as New Radio (NR), Wi-Fi, Long Term Evolution (LTE), LTE-Advanced, 5G, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are also applicable in further development of the existing wireless communication networks such as e.g. WCDMA and LTE.

In the wireless communication network 1, a wireless device 10 referred to herein as V2X UE with VAE client(s), such as a mobile station, a non-access point (non-AP) STA, a STA, a user equipment and/or a wireless terminals, may communicate via one or more Access Networks (AN), e.g. a RAN, to one or more core networks (CNs). It should be understood by the skilled in the art that "wireless device" is a non-limiting term which means any terminal, wireless communications terminal, user equipment, internet of things (IoT) capable device, Machine Type Communication (MTC) device, Device to Device (D2D) terminal, or node e.g. smart phone, laptop, mobile phone, sensor, relay, mobile tablets or even a small base station communicating within a service area. Embodiments herein generally relate to the resource management of wireless communication networks with the participation of device-to-device capable UEs, such as Vehicle to Vehicle (V2V) authorized UEs or ProSe authorized UEs. Another wireless device 10' may also be present in the wireless communication network 1.

The wireless communication network 1 comprises a radio network node 12 providing radio coverage over a geographical area referred to as service area 11 or cell, which may be provided by one or more beams or a beam group where the group of beams is covering the service area of a first radio access technology (RAT), such as NR, 5G, LTE, Wi-Fi or similar. A radio network node, such as the radio network node 12, may also serve multiple cells. The radio network node 12 may be a transmission and reception point e.g. a radio-access network node such as a Wireless Local Area Network (WLAN) access point or Access Point Station (AP STA), an access controller, a base station e.g. a radio base station such as a NodeB, an evolved Node B (eNB, eNode B), a gNodeB, a base transceiver station, a radio remote unit, an Access Point Base Station, a base station router, a transmission arrangement of a radio base station, a stand-alone access point or any other network unit capable of communicating with a wireless device within the service area served by the radio network node depending e.g. on the radio access technology and terminology used. The radio network node 12 communicates with the wireless device 10 with Downlink (DL) transmissions to the wireless device 10 and Uplink (UL) transmissions from the wireless device 10 over a radio interface such as a LTE-Uu.

The wireless communication network 1 further comprises a network node 13 such as a VAE server, V2X application server (AS), a V2X server or another application server.

Embodiments herein enable VAE clients of wireless devices such as V2X UEs to deliver uplink V2X messages to the network node 13 such as V2X servers and other wireless devices and specifies the protocol and message fields. E.g. a vehicle application enabler (VAE) client of the wireless device 10 receives, from a V2X application specific client, a V2X message of a service with a service ID. The VAE client further determines a network node for receiving an uplink V2X message based on the service ID; and transmits the uplink V2X message to the determined network node with the service ID.

Embodiments herein may disclose a procedure when the VAE client transmits to the network node 13 the uplink (UL) V2X message denoted as a V2X uplink message delivery.

The VAE capabilities may provide support for uplink V2X message delivery from the V2X UE to the V2X application specific server.

Information flows

V2X Message

Table 1 describes the information for the VAE client in e.g. the wireless device 10 or 10' to transmit in an uplink V2X message to the network node 13 e.g. the VAE server.

TABLE 1

| Uplink V2X Message | | |
|---|---|---|
| Information element | Status | Description |
| V2X UE ID | Mandatory | Identifier of the V2X UE, e.g. StationID specified in ETSI TS 102 894-2. |
| V2X Message | Mandatory | V2X message payload, e.g. ETSI ITS DENM specified in ETSI EN 302 637-3) |
| V2X service ID | Optional | V2X service ID, the V2X UE is sending to the V2X AS (e.g. PSID or ITS AID of ETSI ITS DENM, ETSI ITS CAM) |
| GEO ID | Optional | Geographical area identifier (e.g. subscription URI, tile identifier, geo-fence tile identifier) |

V2X Message Response

Table 2 describes the information flow for the network node 13 such as a VAE server in response to a received uplink V2X message from the VAE client.

TABLE 2

| V2X Message response | | |
|---|---|---|
| Information element | Status | Description |
| Result | Optional | Result from the VAE server in response to V2X message indicating success or failure |

Procedure for Uplink V2X Message Delivery

This subclause describes the procedures for delivering V2X messages from the wireless device 10 such as a V2X UE to the network node 13 such as a V2X application server.

Procedure

Pre-conditions:

1. The VAE client may have discovered the VAE server as described in subclause 9.1.2 in [1].

2. The VAE client may have registered to a V2X service identified by a V2X Service ID as described in subclause 9.2 in [1].

Figure 4:
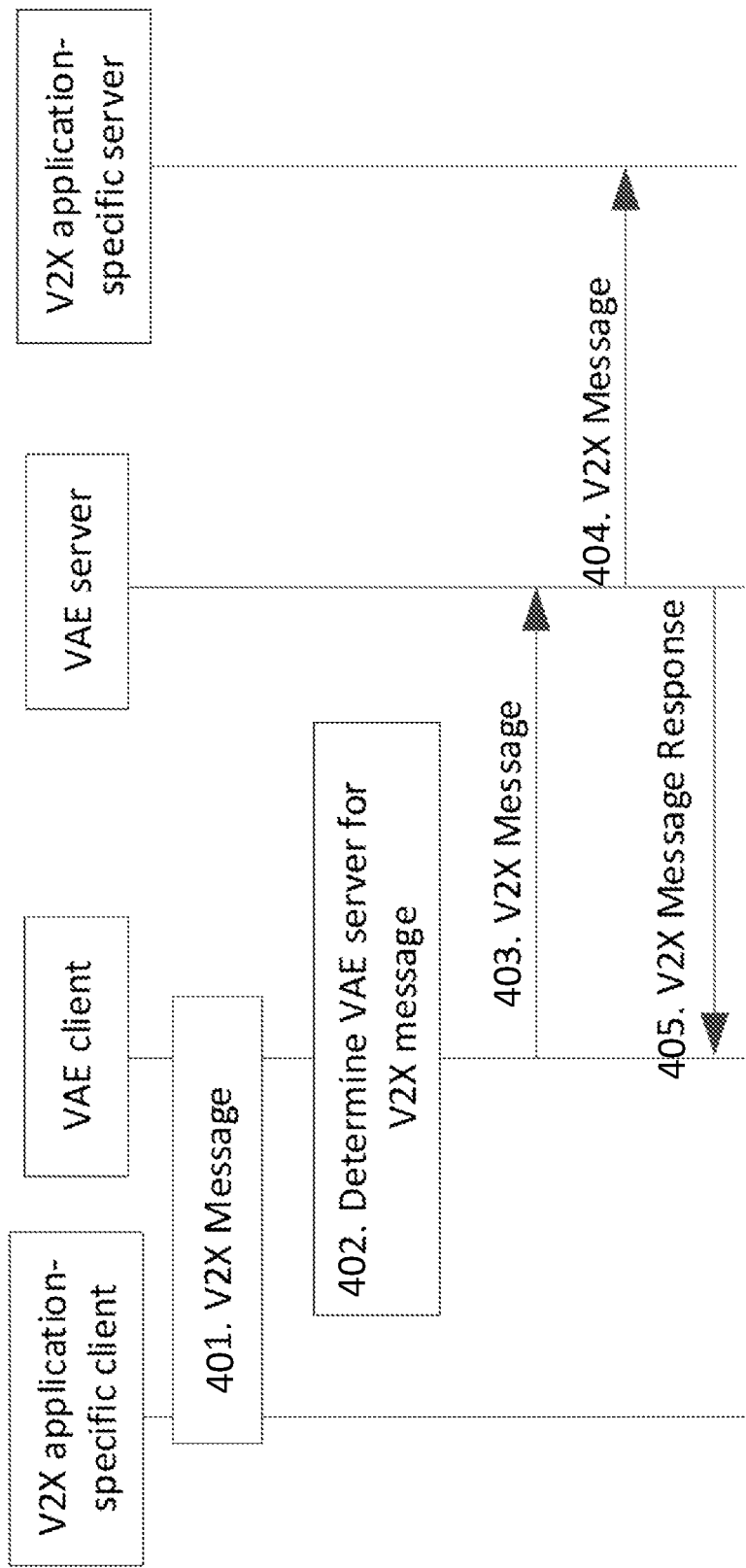
FIG. 4 is a combined flowchart and signalling scheme according to some embodiments herein.

FIG. 4 shows a procedure for delivering messages from the V2X UE to the V2X application server.

401. The V2X application-specific client sends a V2X message of a service with Service ID to the VAE client.

402. The VAE client determines the VAE server for receiving the V2X message with V2X Service ID.

403. The VAE client transmits the V2X message to the VAE server.

404. The VAE server provides the V2X message to the application-specific server.

405. The VAE server may provide a V2X message response to the VAE client.

V2X uplink message delivery for UE to UE communication over LTE Uu

The VAE capabilities may provide support for V2X message delivery from the V2X UE to another V2X UE using LTE Uu.

Information flows

Table 3 describes the information for a VAE client to transmit in an V2X message to the VAE server.

TABLE 3

| UL V2X Message | | |
|---|---|---|
| Information element | Status | Description |
| V2X UE Receiver IDs | Mandatory | Identifier of the V2X UEs receiving the V2X message (e.g. StationID specified in ETSI TS 102 894-2) |
| V2X UE Sender ID | Mandatory | Identifier of the V2X UE (e.g. StationID specified in ETSI TS 102 894-2) |
| V2X Message | Mandatory | V2X message payload (e.g. ETSI ITS DENM specified in ETSI EN 302 637-3) |
| V2X service ID | Optional | V2X service ID, the V2X UE is sending to the V2X AS (e.g. PSID or ITS AID of ETSI ITS DENM, ETSI ITS CAM) |
| GEO ID | Optional | Geographical area identifier (e.g. subscription URI, tile identifier, geo-fence tile identifier) |

V2X Message Response

Table 4 describes the information flow for a VAE server in response to a received V2X message from the VAE client.

TABLE 4

| V2X Message response | | |
|---|---|---|
| Information element | Status | Description |
| Result | Optional | Result from the VAE server in response to V2X message indicating success or failure |

Uplink V2X Message Delivery

This subclause describes the procedures for delivering V2X messages from the V2X UE to the V2X application server.

Procedure

Pre-conditions:

1. The VAE client may have discovered the VAE server as described in subclause 9.1.2 in [1].

2. The VAE client may have registered to a V2X service identified by a V2X Service ID as described in subclause 9.2 in [1].

3. The VAE client may have established connection with other V2X UEs.

Figure 5:
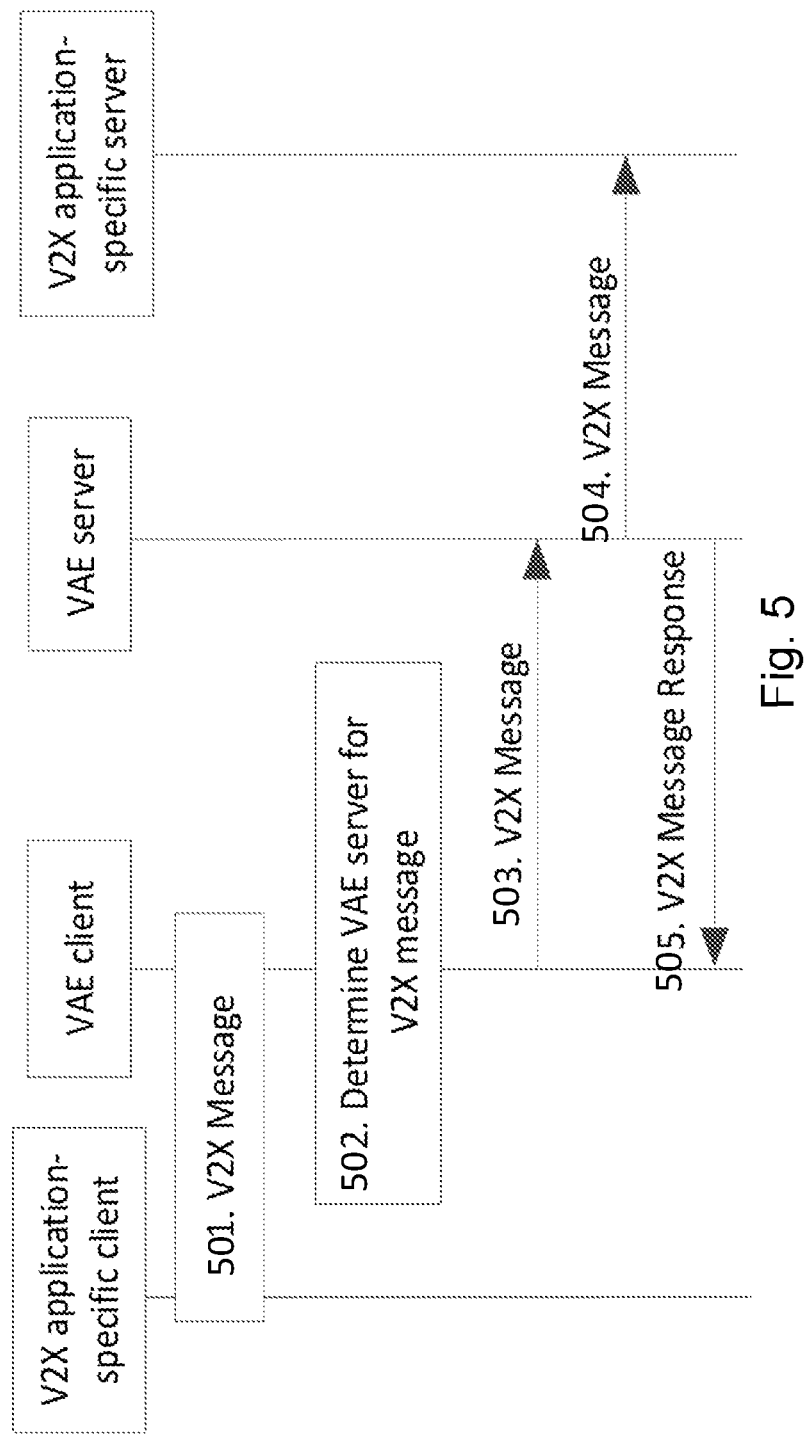
FIG. 5 is a combined flowchart and signalling scheme according to some embodiments herein.

FIG. 5 shows a procedure for delivering messages from the V2X UE to the V2X application server.

501. The V2X application-specific client sends a V2X message of a service with Service ID to the VAE client.

502. The VAE client determines the VAE server for receiving the V2X message with V2X Service ID.

503. The VAE client transmits the V2X message to the VAE server.

504. The VAE server provides the V2X message to the application-specific server.

505. The VAE server may provide a V2X message response to the VAE client.

After receiving the V2X message, the V2X application specific server delivers the V2X message to the intended V2X UEs.

Figure 6:
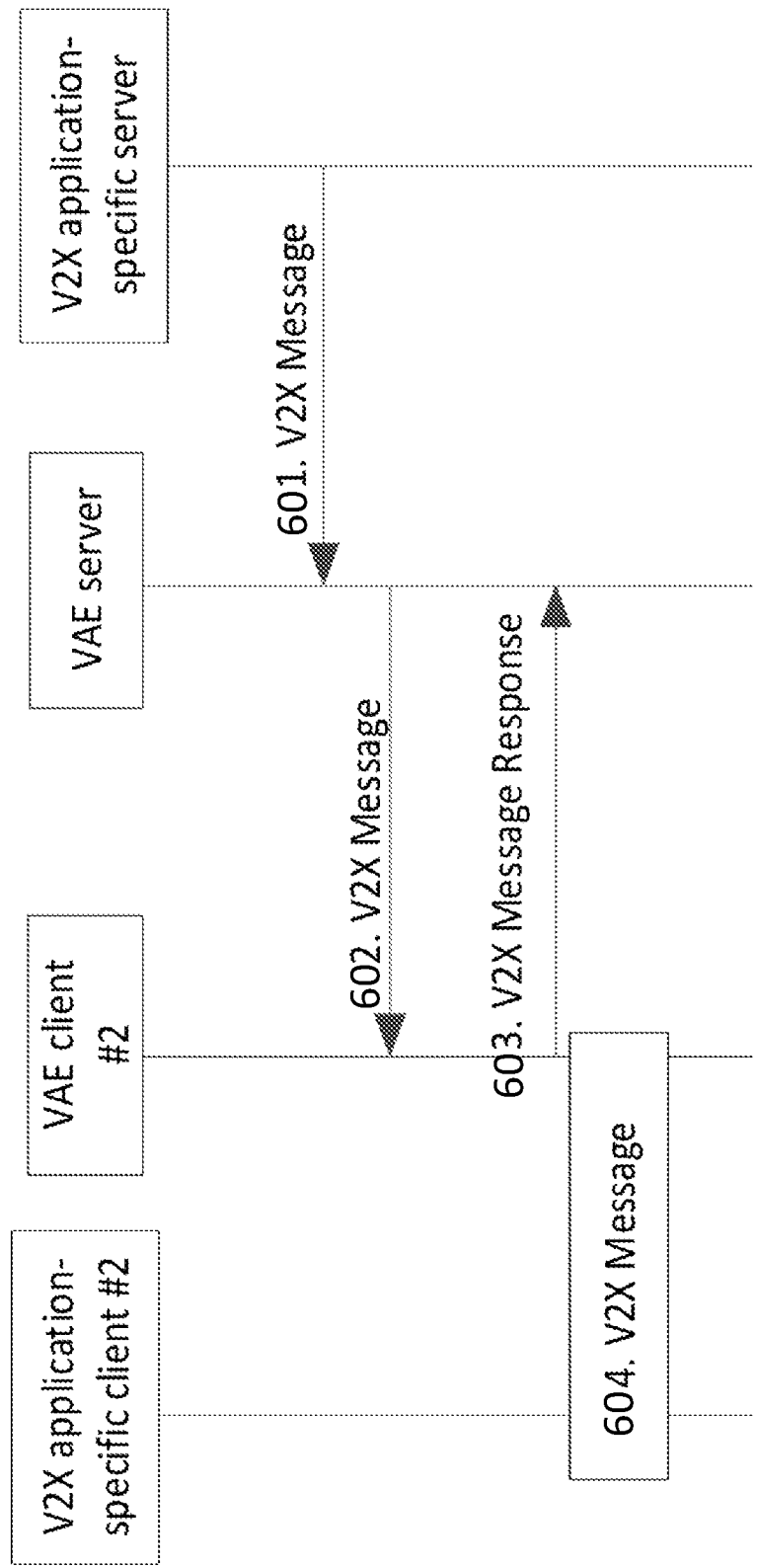
FIG. 6 is a combined flowchart and signalling scheme according to some embodiments herein.

FIG. 6 shows a procedure for delivering messages from the V2X application server to the V2X UEs 601. The V2X application-specific server provides the V2X message of a service with Service ID to the VAE server.

602. The VAE server delivers the V2X messages to the VAE client #2.

603. The VAE client #2 may provide a V2X message response to the VAE server.

604. The VAE client #2 provides the V2X message to the application-specific client.

Optimizations

The uplink V2X message may be used to update the geographical area of the V2X UE at the V2X application server without an explicit need for geographical area tracking message.

Optimizations for uplink V2X message distribution based on downlink received V2X messages. A V2X UE may refrain from sending an uplink V2X message such that only a subset of vehicles report to the V2X AS, those already starting to receive messages need not to deliver uplink messages.

The V2X application server may decide to deliver the received message in uplink via unicast or multicast or other modes to the V2X UEs.

The V2X application server may not deliver the V2X message to V2X UEs e.g. outdated message.

The V2X application server may not deliver the V2X message to all V2X UEs e.g. not to a V2X UE that has left a group or changed geographic area.

The same or different VAE server may be used for delivering the V2X message for other V2X UEs.

The uplink V2X message may go to the VAE server without being forwarded to the V2X application-specific server.

Figure 7A:
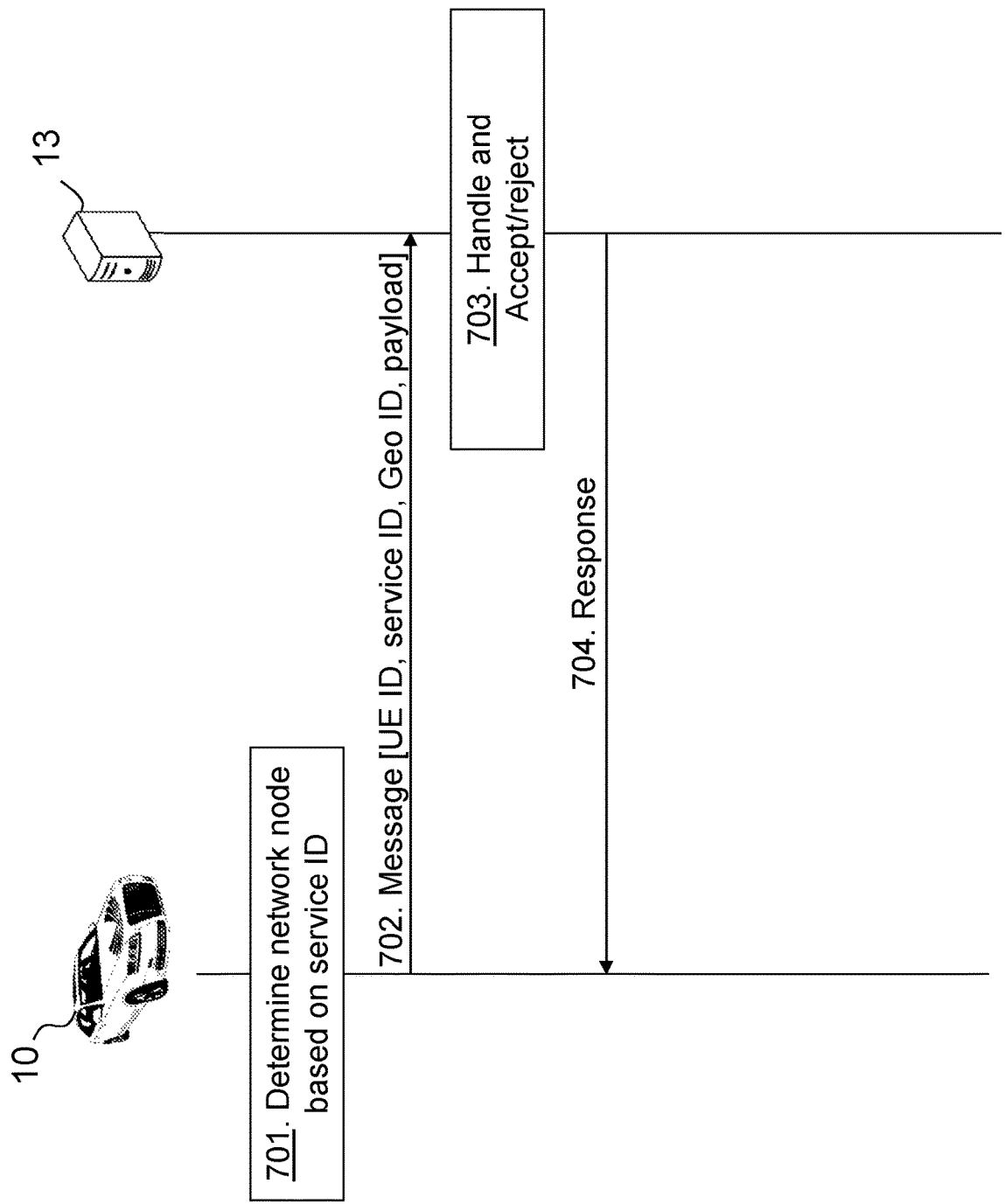
FIG. 7a is a combined flowchart and signalling scheme according to some embodiments herein.

FIG. 7a is a combined flowchart and signaling scheme according to some embodiments herein.

Action 701. The wireless device 10 may determine network node for receiving an UL message such as a V2x message based on a service ID of the service used. The service ID may be obtained from the service used.

Action 702. The wireless device 10, via the VAE client, then transmits the UL V2X message to or towards the network node 13 wherein the UL V2X message comprises one or more of: wireless device identity, payload of message such as location of detected object, service ID of the service, and geographical identity of the location of the wireless device. The UL V2X message may thus comprise data indicating the wireless device such as UE ID and may comprise one or more of the following: the data relating to and/or describing a service; and the indication indicating a geographical area. The UL message may comprise indication of receiving wireless device such as a UE ID for forwarding the UL message.

Action 703. The network node 13 may then handle the UL message upon reception of the UL message e.g. process the payload and distribute to the service.

Action 704. The network node 13 may then upon reception of the message respond with a response indicating success or failure.

It is herein described the procedures and information flows for uplink V2X communication from a V2X UE to a V2X application server and to other V2X UEs using long-range cellular LTE Uu. Several optimizations are also disclosed.

Figure 7B:
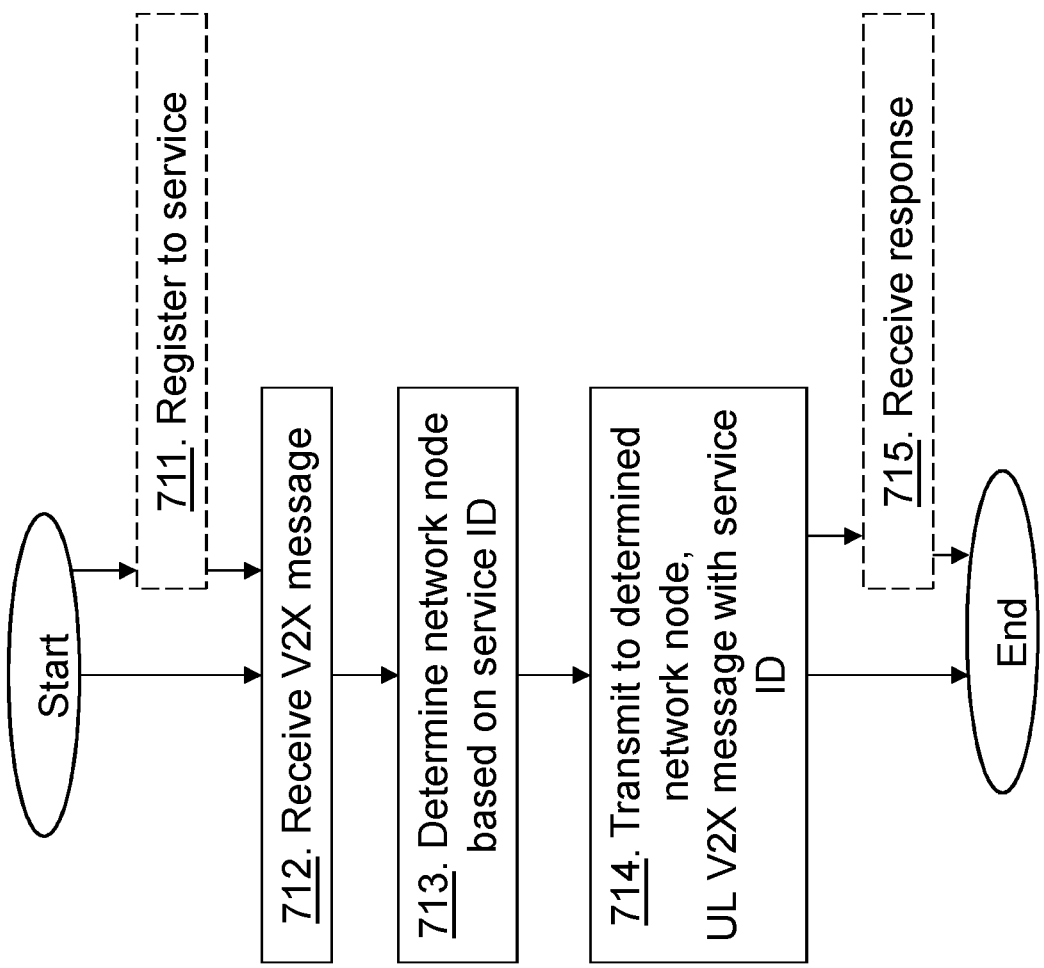
FIG. 7b is a flowchart depicting a method performed by a VAE client according to some embodiments herein.

The method actions performed by the VAE client of the wireless device 10 for using a service in the wireless communication network for V2X wireless devices according to embodiments herein will now be described with reference to a flowchart depicted in FIG. 7b. The actions do not have to be taken in the order stated below, but may be taken in any suitable order. Actions performed in some embodiments are marked with dashed boxes.

Action 711. The VAE client may register to the service identified by the service ID.

Action 712. The VAE client receives, from the V2X application specific client, the V2X message of a service with a service ID.

Action 713. The VAE client determines the network node 13 for receiving the uplink V2X message based on the service ID. It should be noted that the network node may be a vehicle application enabler server or another server. The VAE server can be owned by a mobile network operator or a service provider as road authority.

Action 714. The VAE client transmits the uplink V2X message to the determined network node with the service ID. The uplink V2x message may further comprise one or more of: wireless device identity, payload of message, and geographical identity of the location of the wireless device.

Action 715. The VAE client may receive from the network node a response indicating success or failure.

Figure 7C:
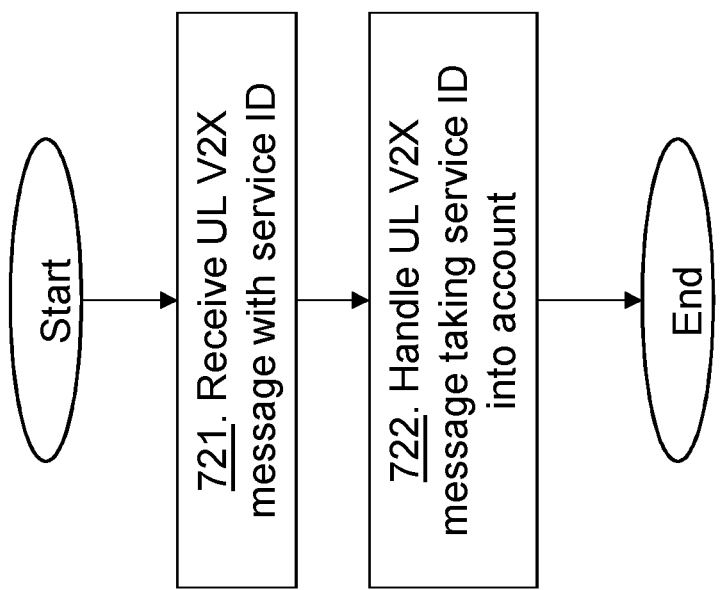
FIG. 7c is a flowchart depicting a method performed by a network node according to some embodiments herein.

The method actions performed by the network node 13, such as the VAE server, for handling communication of vehicle to anything, V2X, wireless devices in a wireless communication network according to embodiments herein will now be described with reference to a flowchart depicted in FIG. 7c. The actions do not have to be taken in the order stated below, but may be taken in any suitable order. Actions performed in some embodiments are marked with dashed boxes.

Action 721. The network node 13 receives, from the VAE client of the wireless device the uplink V2X message with the service ID.

Action 722. The network node 13 handles the uplink V2X message taking the service ID into account. E.g. the network node when being the vehicle application enabler server provides the uplink V2X message to a V2X application-specific server e.g. associated with the service ID.

The network node may further transmit to the VAE client a response indicating success or failure.

Figure 8:
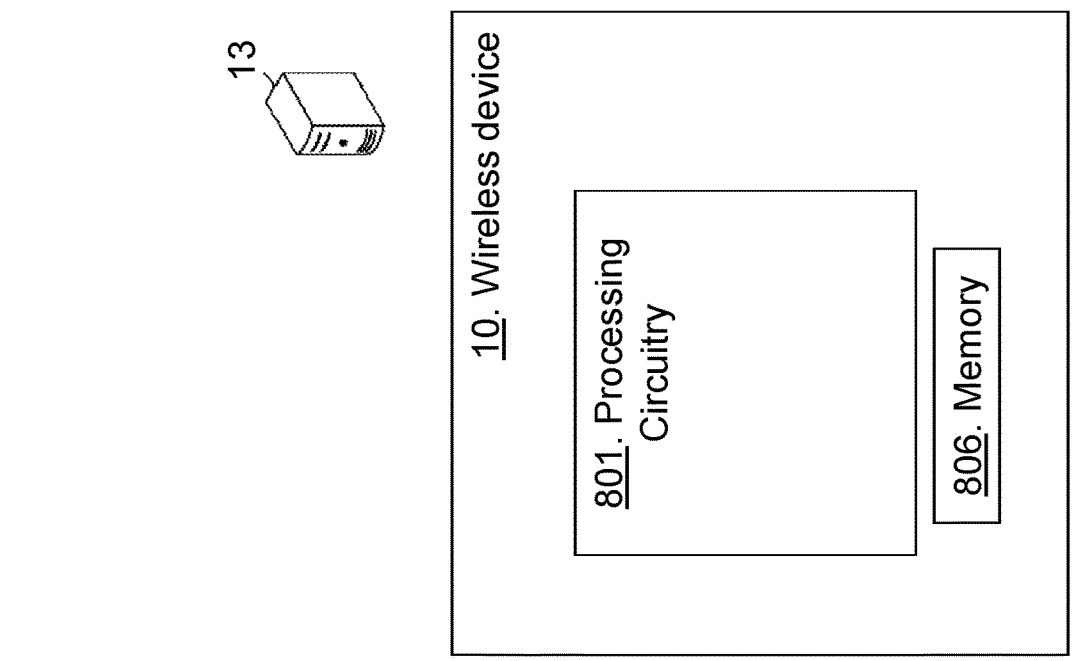
FIG. 8 is a schematic block diagram depicting a wireless device with a VAE client according to embodiments herein.
Figure 8:
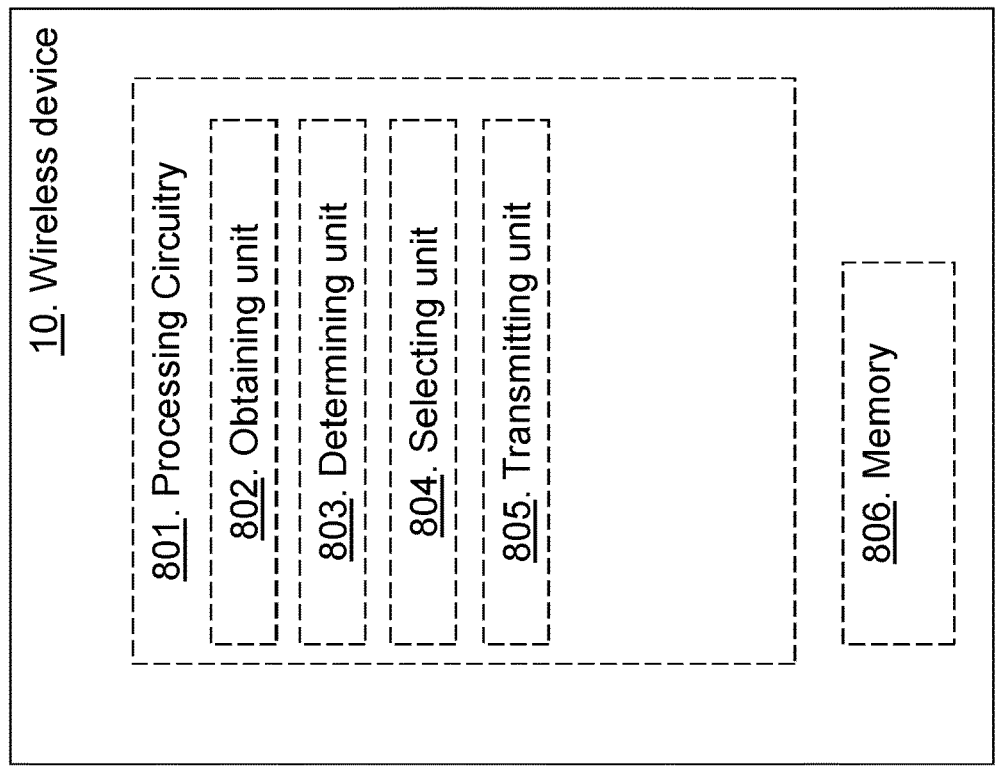
Figure 8:
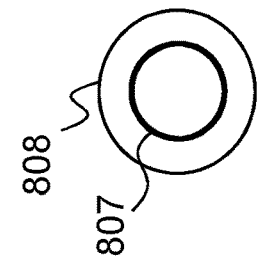

FIG. 8 is a schematic block diagram depicting the wireless device 10 with the VAE client for using the service in the wireless communication network for V2X wireless devices.

The wireless device 10 may comprise processing circuitry 801, e.g. one or more processors, configured to perform the methods herein. The VAE client may be configured to register to the service identified by the service ID.

The wireless device 10 may comprise an obtaining unit 802, e.g. receiver or transceiver. The VAE client, the wireless device 10, the processing circuitry 801, and/or the obtaining unit 802 is configured to receive, from the V2X application specific client, the V2X message of the service with the service ID. The VAE client, the wireless device 10, the processing circuitry 801, and/or the obtaining unit 802 may be configured to obtain the UL message with the service ID. The wireless device 10 may obtain the UL message from an application/service or from another wireless device.

The wireless device 10 may comprise a determining unit 803. The VAE client, the wireless device 10, the processing circuitry 801, and/or the determining unit 803 is configured to determine the network node 13 for receiving the UL V2X message based on the service ID.

The wireless device 10 may comprise a selecting unit 804. The wireless device 10, the processing circuitry 801, and/or the selecting unit 804 may be configured to select the network node 13.

The wireless device 10 may comprise a transmitting unit 805, e.g. transmitter or transceiver. The VAE client, the wireless device 10, the processing circuitry 801, and/or the transmitting unit 805 is configured to transmit the UL V2X message to the determined network node 13 with the service ID. The uplink V2x message may further comprise one or more of: wireless device identity, payload of message, and geographical identity of the location of the wireless device.

The VAE client may be configured to receive from the network node a response indicating success or failure.

The wireless device 10 further comprises a memory 806 comprising one or more memory units. The memory 806 comprises instructions executable by the processing circuitry 801 to perform the methods herein when being executed in the wireless device 10. The memory 806 is arranged to be used to store e.g. information, data such as UE ID, service ID, geo ID, network node IDs, conditions, locations, speed, category, etc.

The methods according to the embodiments described herein for the wireless device 10 are respectively implemented by means of e.g. a computer program 807 or a computer program product 807, comprising instructions, i.e., software code portions, which, when executed on at least one processor, cause the at least one processor to carry out the actions described herein, as performed by the wireless device 10. The computer program product 807 may be stored on a computer-readable storage medium 808, e.g. a disc, a universal serial bus (USB) device or similar. The computer-readable storage medium 808, having stored thereon the computer program product 807, may comprise the instructions which, when executed on at least one processor, cause the at least one processor to carry out the actions described herein, as performed by the wireless device 10. In some embodiments, the computer-readable storage medium 808 may be a transitory or a non-transitory computer-readable storage medium. Thus, the wireless device 10 may comprise the processing circuitry 801 and the memory 806, said memory 806 comprising instructions executable by said processing circuitry 801 whereby said wireless device 10 is operative to perform the methods herein.

Figure 9:
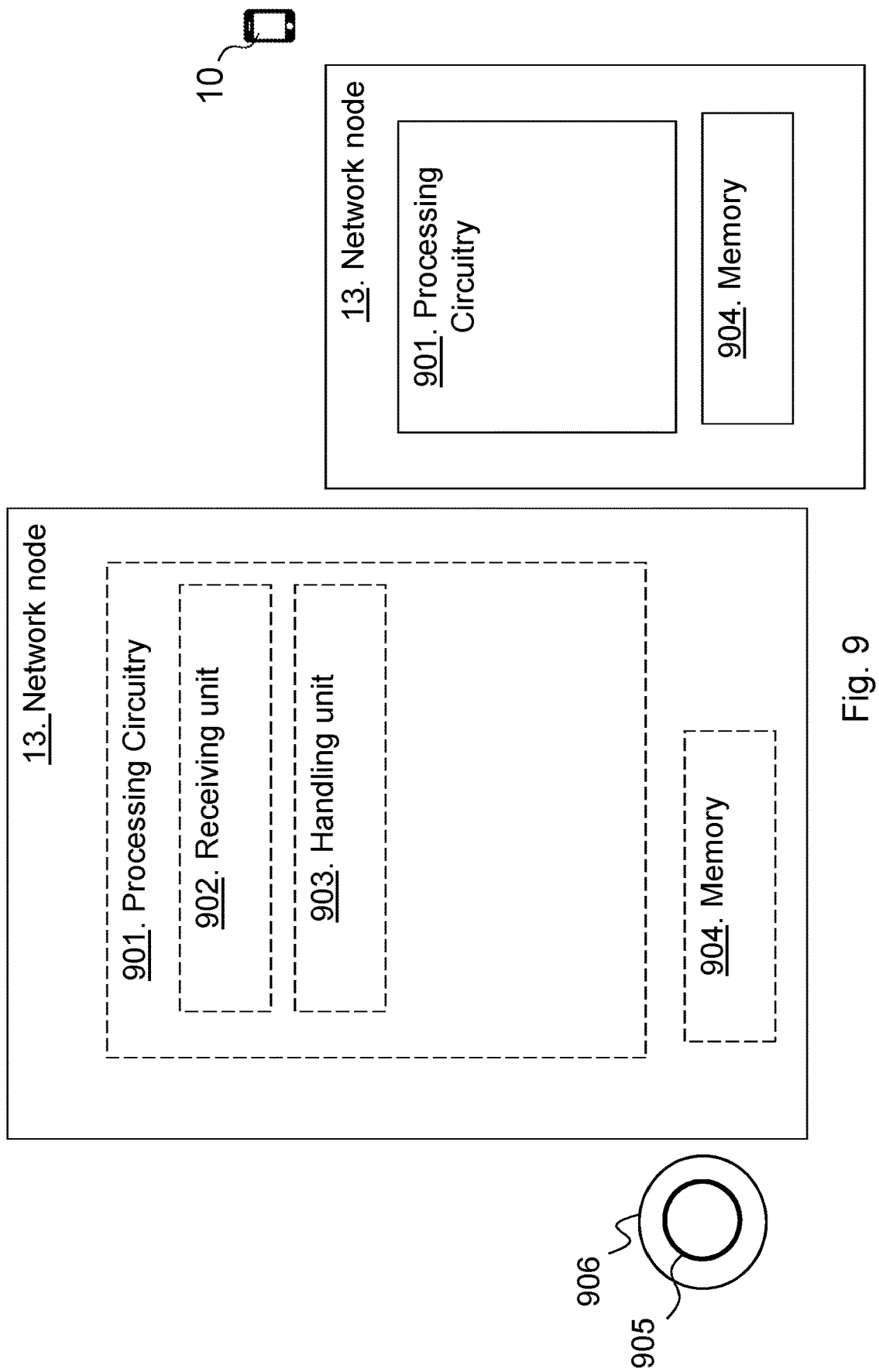
FIG. 9 is a schematic block diagram depicting a network node according to embodiments herein.

FIG. 9 is a schematic block diagram depicting the network node 13 for handling communication of V2X wireless devices in the wireless communication network e.g. communicating with the wireless device 10 e.g. via the radio network node 12, in the wireless communication network 1. The network node may be a vehicle application enabler server or another server.

The network node 13 may comprise a processing circuitry 901, e.g. one or more processors, configured to perform the methods herein.

The network node 13 may comprise a receiving unit 902, e.g. a receiver or transceiver. The network node 13, the processing circuitry 901, and/or the receiving unit 902 is configured to receive from the VAE client of the wireless device the uplink V2X message with the service ID e.g. receive the UL message from the wireless device wherein the UL message comprises at least the service ID.

The network node 13 may comprise a handling unit 903. The network node 13, the processing circuitry 901, and/or the handling unit 903 is configured to handle the uplink V2X message taking the service ID into account, e.g. handle the UL V2X message based on the service ID in the UL message. The vehicle application enabler server may be configured to handle the uplink V2X message by providing the uplink V2X message to a V2X application-specific server.

The network node 13 further comprises a memory 904 comprising one or more memory units. The memory 904 comprises instructions executable by the processing circuitry 901 to perform the methods herein when being executed in the network node 13. The memory 904 is arranged to be used to store e.g. information, data such as application, service ID, UE ID, etc.

The methods according to the embodiments described herein for the network node 13 are respectively implemented by means of e.g. a computer program 905 or a computer program product 905, comprising instructions, i.e., software code portions, which, when executed on at least one processor, cause the at least one processor to carry out the actions described herein, as performed by the network node 13. The computer program product 905 may be stored on a computer-readable storage medium 906, e.g. a disc, a USB stick, or similar. The computer-readable storage medium 906, having stored thereon the computer program product 905, may comprise the instructions which, when executed on at least one processor, cause the at least one processor to carry out the actions described herein, as performed by the network node 13. In some embodiments, the computer-readable storage medium may be a transitory or a non-transitory computer-readable storage medium. Thus, the network node 13 may comprise the processing circuitry 901 and the memory 904, said memory 904 comprising instructions executable by said processing circuitry 901 whereby said network node 13 is operative to perform the methods herein.

As will be readily understood by those familiar with communications design, means, units or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless terminal or network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications receivers will appreciate the cost, performance, and maintenance tradeoffs inherent in these design choices.

Figure 10:
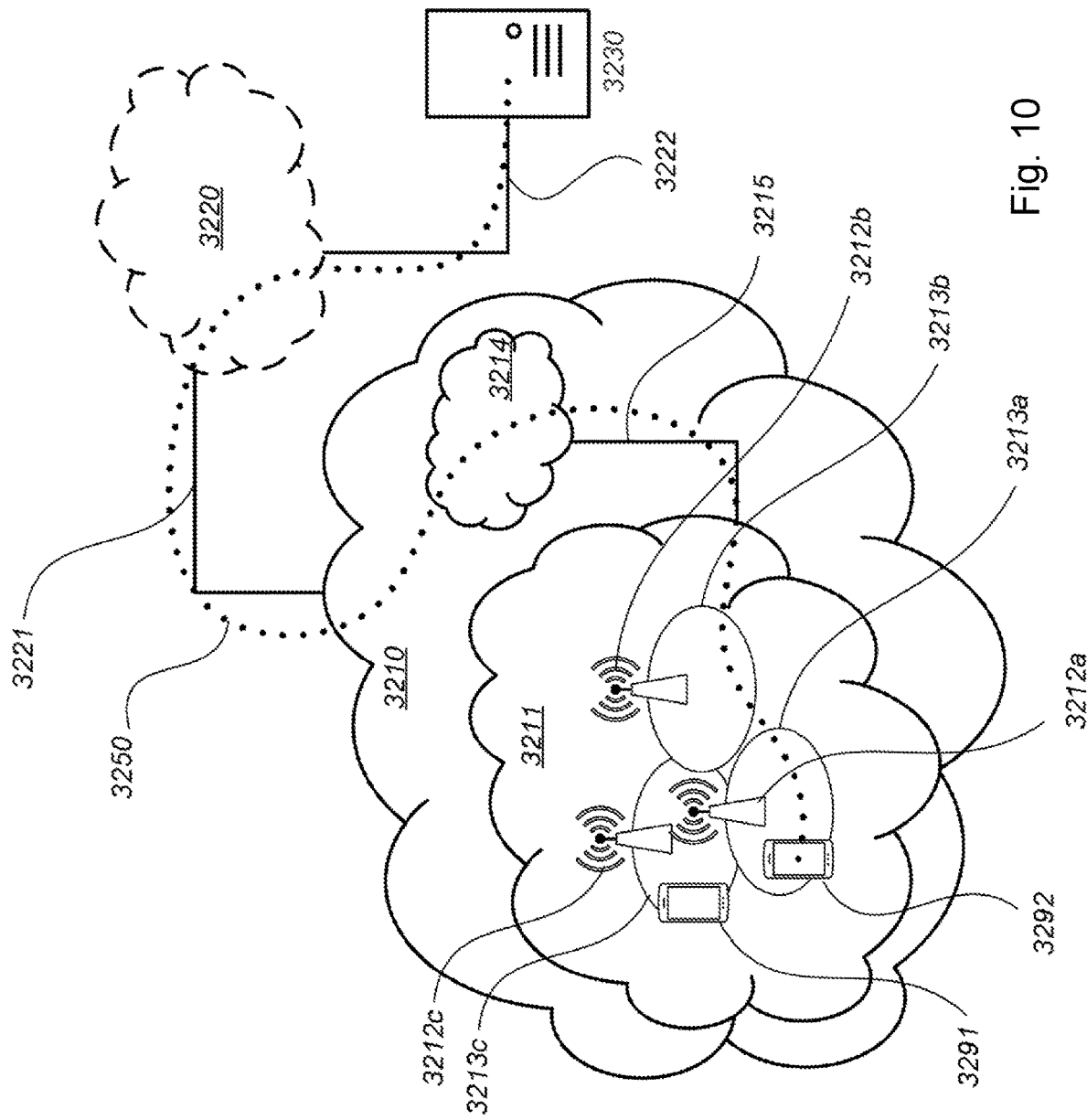
FIG. 10 schematically illustrates a telecommunication network connected via an intermediate network to a host computer.

With reference to FIG. 10, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212a, 3212b, 3212c, such as NBs, eNBs, gNBs or other types of wireless access points being examples of the radio network node 12 herein, each defining a corresponding coverage area 3213a, 3213b, 3213c. Each base station 3212a, 3212b, 3212c is connectable to the core network 3214 over a wired or wireless connection 3215. A first user equipment (UE) 3291, being an example of the wireless device 10, located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 10 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 11. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 11) served by the base station 3320. The communication interface 3326 may be configured to facilitate a connection 3360 to the host computer 3310. The connection 3360 may be direct or it may pass through a core network (not shown in FIG. 11) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 11:
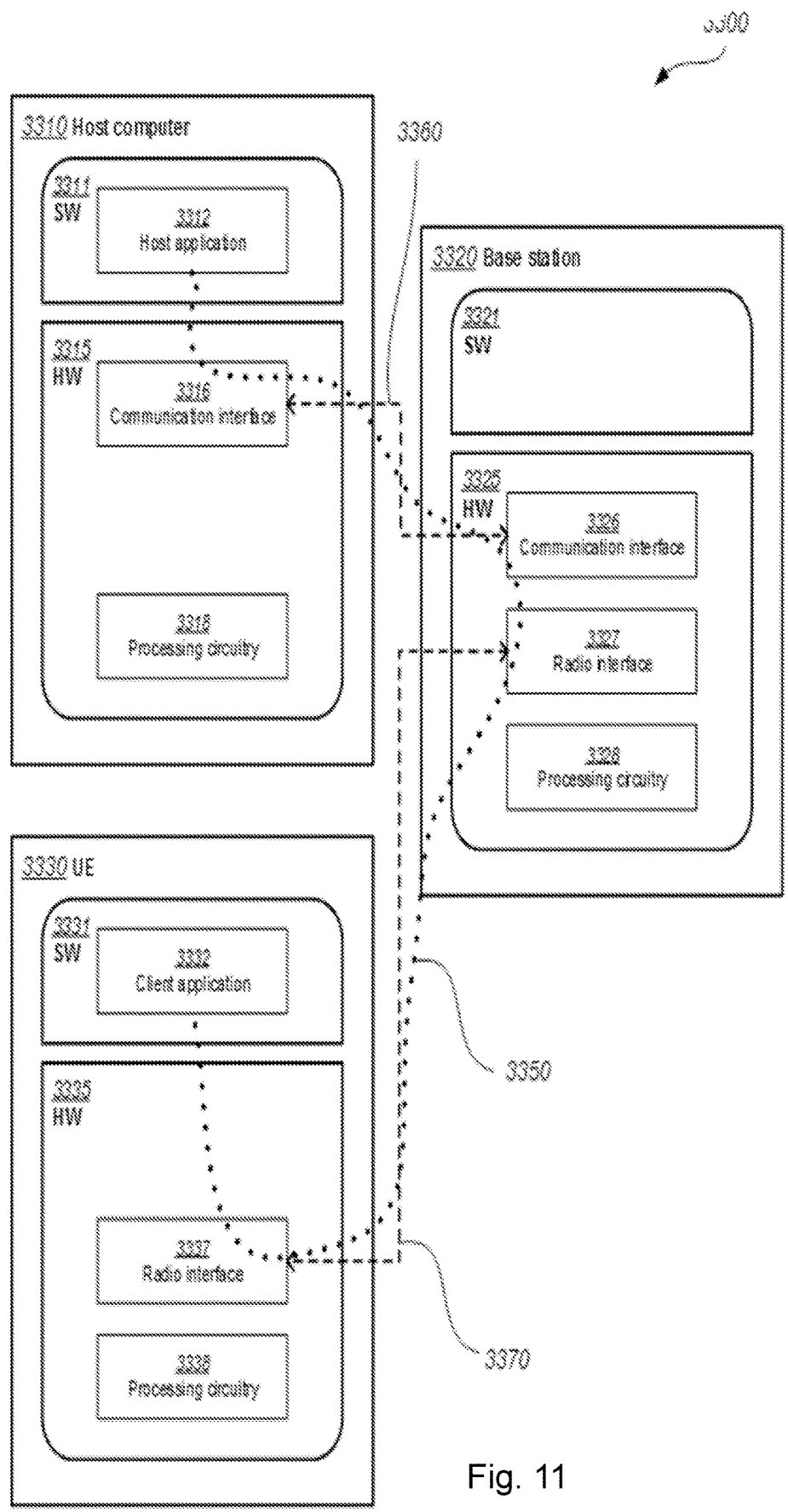
FIG. 11 is a generalized block diagram of a host computer communicating via a base station with a user equipment over a partially wireless connection.

It is noted that the host computer 3310, base station 3320 and UE 3330 illustrated in FIG. 11 may be identical to the host computer 3230, one of the base stations 3212*a*, 3212*b*, 3212*c* and one of the UEs 3291, 3292 of FIG. 10, respectively. This is to say, the inner workings of these entities may be as shown in FIG. 11 and independently, the surrounding network topology may be that of FIG. 10.

In FIG. 11, the OTT connection 3350 has been drawn abstractly to illustrate the communication between the host computer 3310 and the user equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the latency by letting the wireless device transmit UL V2x messages and thereby provide benefits such as reduced user waiting time, and better responsiveness.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIG. 12 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 12 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

FIG. 13 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 13 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

FIG. 14 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 14 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

FIG. 15 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 15 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

Modifications and other embodiments of the disclosed embodiments will come to mind to one skilled in the art having the benefit of the teachings presented in the foregoing descriptions and the associated drawings. Therefore, it is to be understood that the embodiment(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

REFERENCES

[1] 3GPP TS 23.286, Application layer support for V2X services; Functional architecture and information flows, V1.1.0, 04-2019.

[2] 3GPP TS 23.434, Service Enabler Architecture Layer for Verticals; Functional architecture and information flows, V1.1.0, 04-2019.

ABBREVIATIONS

2X AS V2X application server
VAE V2X Application Enabler
V2X UE User equipment
ITS Intelligent Transport Systems
ITS-S ITS Station
V2X Vehicle to everything
Annex
1. Introduction The current TS describes the procedure for downlink V2X message distribution from V2X AS to V2X UE. In several V2X applications, e.g. road hazard warning use cases, where vehicles send the warning messages of the detected danger situations to the backend server, which further disseminates warning messages to other vehicles via downlink communication. In this case, V2X messages need to be delivered from the V2X UE to the V2X AS.

2. Reason for Change

To specify the procedure for uplink V2X message delivery from the V2X UE to the V2X AS.

3. Conclusions

<Conclusion Part (Optional)>

4. Proposal

It is proposed to agree the following changes to 3GPP TS 23.286 v 1.1.0.

First Change 9.x V2X uplink message delivery 9.x.1 General

The VAE capabilities provide support for uplink V2X message delivery from the V2X UE to the V2X application specific server.

9.x.2 Information flows 9.x.2.1 V2X Message

Table 9.x.2.1-1 describes the information flow for a VAE client to transmit a V2X message to the VAE server.

TABLE 9.x.2.1-1

V2X Message

| Information element | Status | Description |
| --- | --- | --- |
| V2X UE ID | M | Identifier of the V2X UE (e.g. StationID specified in ETSI TS 102 894-2 [15]) |
| V2X Message | M | V2X message payload (e.g. ETSI ITS DENM [X]) |
| V2X service ID | O | V2X service ID, the V2X UE is sending to the V2X AS (e.g. PSID or ITS AID of ETSI ITS DENM, ETSI ITS CAM) |
| GEO ID | O | Geographical area identifier (e.g. subscription URI, tile identifier, geo-fence tile identifier) |

9.x.2.2 V2X Message Response

Table 9.x.2.2-1 describes the information flow for a VAE server in response to a received V2X message from the VAE client.

TABLE 9.x.2.2-1

V2X Message response

| Information element | Status | Description |
| --- | --- | --- |
| Result | O | Result from the VAE server in response to V2X message indicating success or failure |

9.x.3 Uplink V2X Message Delivery 9.x.3.1 General

This subclause describes the procedures for delivering V2X messages from the V2X UE to the V2X application server.

9.x.3.2 Procedure

Pre-conditions:

1. The VAE client has discovered the VAE server as described in subclause 9.1.2.
2. The VAE client has registered to a V2X service identified by a V2X Service ID as described in subclause 9.2.

FIG. 4: Procedure for Delivering Messages from V2X UE to the V2X Application Server 1. The V2X application-specific client sends a V2X message of a service with V2X Service ID to the VAE client.
2. The VAE client determines the VAE server for receiving the V2X message with V2X Service ID.
3. The VAE client transmits the V2X message to the VAE server.
4. The VAE server provides the V2X message to the application-specific server.
5. The VAE server may provide a V2X message response to the VAE client.

Next Change

REFERENCES

The following documents contain provisions which, through reference in this text, constitute provisions of the present document.

References are either specific (identified by date of publication, edition number, version number, etc.) or non-specific.

For a specific reference, subsequent revisions do not apply.

For a non-specific reference, the latest version applies. In the case of a reference to a 3GPP document (including a GSM document), a non-specific reference implicitly refers to the latest version of that document in the same Release as the present document.

[1] 3GPP TR 21.905: "Vocabulary for 3GPP Specifications".

[2] 3GPP TS 22.185: "Service requirements for V2X services; Stage 1".

[3] 3GPP TS 22.186: "Enhancement of 3GPP support for V2X scenarios; Stage 1".

[4] 3GPP TS 23.280: "Common functional architecture to support mission critical services".

[5] 3GPP TS 23.285: "Architecture enhancements for V2X services".

[6] 3GPP TS 23.434: "Service enabler architecture layer for verticals; Functional architecture and information flows; Stage 2".

[7] 3GPP TS 23.468: "Group Communication System Enablers for LTE (GCSE_LTE); Stage 2".

[8] 3GPP TS 23.682: "Architecture enhancements to facilitate communications with packet data networks and applications".

[9] 3GPP TR 23.795: "Study on application layer support for V2X services".

[10] 3GPP TS 26.346: "Multimedia Broadcast/Multicast Service (MBMS); Protocols and codecs".

[11] 3GPP TS 26.348: "Northbound Application Programming Interface (API) for Multimedia Broadcast/Multicast Service (MBMS) at the xMB reference point".

[12] 3GPP TS 29.214: "Policy and Charging Control over Rx reference point".

[13] 3GPP TS 29.468: "Group Communication System Enablers for LTE (GCSE_LTE); MB2 Reference Point; Stage 3".

[14] 3GPP TS 36.300: "Evolved Universal Terrestrial Radio Access (E-UTRA) and Evolved Universal Terrestrial Radio Access Network (E-UTRAN); Overall description; Stage 2".

[15] ETSI TS 102 894-2 (V1.2.1): "Intelligent Transport Systems (ITS); Users and applications requirements; Part 2: Applications and facilities layer common data dictionaryMultimedia Broadcast/Multicast Service (MBMS); Protocols and codecs".

[16] ETSI TS 102 965 (V1.4.1): "Intelligent Transport Systems (ITS); Application Object Identifier (ITS-AID); Registration".

[17] ISO TS 17419: "Intelligent Transport Systems—Cooperative systems—Classification and management of ITS applications in a global context".

[X] ETSI-EN 302 637-3 (V1.3.0): "Intelligent Transport Systems (ITS); Vehicular Communications; Basic Set of Applications; Part 3: Specifications of Decentralized Environmental Notification Basic Service".

1. Introduction

This contribution proposes a pCR to architecture requirements to include VAE capabilities support for uplink V2X message distribution.

In several V2X applications, e.g. road hazard warning use cases, where vehicles send the warning messages of the detected danger situations to the backend server, which further disseminates warning messages to other vehicles via downlink communication. In this case, V2X messages need to be delivered from the V2X UE to the V2X AS.

2. Reason for Change

The VAE capabilities shall support the delivery of V2X messages from the V2X UE to the V2X application.

3. Conclusions

<Conclusion part (optional)>

4. Proposal

It is proposed to agree the following changes to 3GPP TS 23.286 v 1.1.0.

* * * First Change * * * *

4.5 V2X application message distribution 4.5.1 Description

This subclause specifies the V2X (e.g. ETSI ITS, SAE) message distribution requirements.

4.5.2 Requirements

[AR-4.5.2-a] The VAE server shall provide a mechanism to distribute V2X messages to all registered receivers in targeted geographical areas.

[AR-4.5.2-b] The VAE server shall enable the delivery of several V2X messages over the same connection.

[AR-4.5.2-c] The VAE client shall have the capability to register to V2X messages within one or more geographical area.

[AR-4.5.2-d] The VAE server shall have the capability to only forward V2X messages to authorized V2X UEs in target geographical areas.

[AR-4.5.2-e] The VAE server shall provide a mechanism for priority support of different V2X messages (e.g. safety message).

[AR-4.5.2-f] The VAE capabilities shall support the delivery of V2X messages from the V2X UE to the V2X application.

The invention claimed is:

1. A method performed by a vehicle to everything application enabler (VAE) client of a wireless device for using a service in a wireless communication network for vehicle to anything (V2X) wireless devices, the method comprising:
receiving, from a V2X application specific client, a V2X message of a service with a service ID;
determining a VAE server for receiving an uplink V2X message based on the service ID; and
transmitting the uplink V2X message to the determined VAE server with the service ID that was used to determine the VAE server.

2. The method according to claim 1 further comprising registering by the VAE client of the wireless device to the service identified by the service ID.

3. The method according to claim 1, wherein the uplink V2X message further comprises one or more of: wireless device identity, payload of message, geographical identity of a location of the wireless device, or any combination thereof.

4. The method according to claim 1 further comprising receiving from a network node a response indicating success or failure.

5. A method performed by a vehicle to everything application enabler (VAE) server for handling communication of vehicle to anything (V2X) wireless devices in a wireless communication network, the method comprising:
receiving from a VAE client of a wireless device an uplink V2X message with a service ID, in which the VAE client received the uplink V2X message with the service ID from a V2X application specific client, determined the VAE server for receiving the uplink V2X message with the service ID, and transmitted the uplink V2X message with the service ID that was used to determine the VAE server; and
handling the uplink V2X message taking the service ID into account.

6. The method according to claim 5, wherein the VAE server provides the uplink V2X message to a V2X application-specific server.

7. A vehicle to everything application enabler (VAE) client of a wireless device for using a service in a wireless communication network for vehicle to anything (V2X) wireless devices, and wherein the VAE client is to:
receive, from a V2X application specific client, a V2X message of a service with a service ID;
determine a VAE server for receiving an uplink V2X message based on the service ID; and
transmit the uplink V2X message to the determined VAE server with the service ID that is used to determine the VAE server.

8. The VAE client according to claim 7, wherein the VAE client is further configured to register to the service identified by the service ID.

9. The VAE client according to claim 7, wherein the uplink V2X message further comprises one or more of: wireless device identity, payload of message, geographical identity of a location of the wireless device, or any combination thereof.

10. The VAE client according to claim 7, wherein the VAE client is further configured to receive from a network node a response indicating success or failure.

11. A vehicle to everything application enabler (VAE) server for handling communication of vehicle to anything (V2X) wireless devices in a wireless communication network, wherein the VAE server is to:
receive, from a VAE client of a wireless device, an uplink V2X message with a service ID, in which the VAE client receives the uplink V2X message with the service ID from a V2X application specific client, determines the VAE server for receiving the uplink V2X message with the service ID, and transmits the uplink V2X message with the service ID that was used to determine the VAE server; and
handle the uplink V2X message taking the service ID into account.

12. The VAE server according to claim 11, wherein the vehicle to everything application enabler server is configured to handle the uplink V2X message by providing the uplink V2X message to a V2X application-specific server.

13. A non-transitory machine-readable storage medium comprising instructions which, when executed on at least one processor, cause a vehicle to everything application enabler (VAE) client of a wireless device for using a service in a wireless communication network for vehicle to anything (V2X) wireless devices to perform operations comprising:
   receiving, from a V2X application specific client, a V2X message of a service with a service ID;
   determining a VAE server for receiving an uplink V2X message based on the service ID;
   and transmitting the uplink V2X message to the determined VAE server with the service ID that is used to determine the VAE server.

14. The non-transitory machine-readable storage medium according to claim 13, wherein the instructions further cause operations comprising registering by the VAE client of the wireless device, to the service identified by the service ID.

15. The non-transitory machine-readable storage medium according to claim 13, wherein the uplink V2X message further comprises one or more of: wireless device identity, payload of message, geographical identity of a location of the wireless device, or any combination thereof.

16. The non-transitory machine-readable storage medium according to claim 13, wherein the instructions further cause operations comprising receiving from a network node a response indicating success or failure.

* * * * *

UNITED STATES PATENT AND TRADEMARK OFFICE
CERTIFICATE OF CORRECTION

PATENT NO. : 12,143,906 B2
APPLICATION NO. : 17/595302
DATED : November 12, 2024
INVENTOR(S) : El Essaili et al.

It is certified that error appears in the above-identified patent and that said Letters Patent is hereby corrected as shown below:

On the Title Page

In Item (57), under "ABSTRACT", in Column 2, Line 3, delete "vehicle to anything" and insert -- vehicle to everything --, therefor.

In Item (56), under "OTHER PUBLICATIONS", in Column 2, Line 56, delete "ETSI" and insert -- ETSI TS --, therefor.

On Page 3, in Item (56), under "OTHER PUBLICATIONS", in Column 1, Line 4, delete "Systems—Cooperative—" and insert -- Systems—Cooperative systems— --, therefor.

In the Specification

In Column 1, Line 42, delete "network" and insert -- system --, therefor.

In Column 2, Line 39, delete "(NVV)" and insert -- (NW) --, therefor.

In Column 11, Line 67, delete "vehicle to anything," and insert -- vehicle to everything, --, therefor.

In the Claims

In Column 21, Lines 59-60, in Claim 1, delete "vehicle to anything" and insert -- vehicle to everything --, therefor.

In Column 22, Line 15, in Claim 5, delete "vehicle to anything" and insert -- vehicle to everything --, therefor.

In Column 22, Line 32, in Claim 7, delete "vehicle to anything" and insert -- vehicle to everything --, therefor.

Signed and Sealed this
First Day of April, 2025

Coke Morgan Stewart
*Acting Director of the United States Patent and Trademark Office*

CERTIFICATE OF CORRECTION (continued)
U.S. Pat. No. 12,143,906 B2

In Column 22, Line 53, in Claim 11, delete "vehicle to anything" and insert -- vehicle to everything --, therefor.

In Column 23, Line 7, in Claim 13, delete "vehicle to anything" and insert -- vehicle to everything --, therefor.